(12) United States Patent
Jung et al.

(10) Patent No.: US 8,239,409 B2
(45) Date of Patent: *Aug. 7, 2012

(54) PROVIDING A MODIFIED NON-COMMUNICATION APPLICATION INTERFACE FOR PRESENTING A MESSAGE

(75) Inventors: Edward K. Y. Jung, Bellevue, WA (US);
Eric C. Leuthardt, St. Louis, MO (US);
Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 204 days.

This patent is subject to a terminal disclaimer.

(21) Appl. No.: 12/661,410

(22) Filed: Mar. 15, 2010

(65) Prior Publication Data

US 2011/0213792 A1 Sep. 1, 2011

Related U.S. Application Data

(63) Continuation-in-part of application No. 12/660,526, filed on Feb. 26, 2010.

(51) Int. Cl.
*G06F 17/30* (2006.01)
(52) U.S. Cl. ........ 707/784; 707/608; 717/171; 709/203; 709/219
(58) Field of Classification Search .................. 707/784, 707/608, 999.01, 999.009, 999.107; 717/171; 709/203, 219
See application file for complete search history.

(56) References Cited

U.S. PATENT DOCUMENTS

| 5,519,808 | A | 5/1996 | Benton, Jr. et al. |
| 6,697,824 | B1 * | 2/2004 | Bowman-Amuah .......... 709/229 |
| 7,665,064 | B2 | 2/2010 | Able et al. |
| 7,877,409 | B2 * | 1/2011 | Lim .............................. 707/781 |
| 7,958,234 | B2 | 6/2011 | Thomas et al. |
| 2005/0216421 | A1 | 9/2005 | Barry et al. |
| 2007/0136462 | A1 | 6/2007 | Nicholas, III |
| 2009/0183186 | A1 | 7/2009 | Murtagh |
| 2009/0222673 | A1 | 9/2009 | Schneck et al. |
| 2009/0240586 | A1 * | 9/2009 | Ramer et al. .................... 705/14 |
| 2010/0146396 | A1 | 6/2010 | Able et al. |

(Continued)

OTHER PUBLICATIONS

"Where people go to be productive"; Microsoft Advertising: Bearing a date of 2010: p. 1; located at: http://advertising.microsoft.com/uk/microsoft-office-advertising: printed on Feb. 26, 2010.

(Continued)

*Primary Examiner* — Leslie Wong

(57) ABSTRACT

A computationally implemented method includes, but is not limited to: determining which of a plurality of end users are to be presented with a message, the plurality of end users having access to one or more non-communication applications through one or more non-communication application interfaces; and providing a modified non-communication application interface for accessing at least one of the one or more non-communication applications to one or more end users who have been determined to be presented with the message, the modified non-communication application interface including at least a channel to access the message. In addition to the foregoing, other method aspects are described in the claims, drawings, and text forming a part of the present disclosure.

43 Claims, 22 Drawing Sheets

U.S. PATENT DOCUMENTS

2011/0041077 A1 2/2011 Reiner

OTHER PUBLICATIONS

U.S. Appl. No. 12/660,526, Jung et al.
U.S. Appl. No. 12/798,753, Jung et al.
U.S. Appl. No. 12/798,915, Jung et al.
U.S. Appl. No. 12/800,141, Jung et al.
U.S. Appl. No. 12/800,245, Jung et al.

* cited by examiner

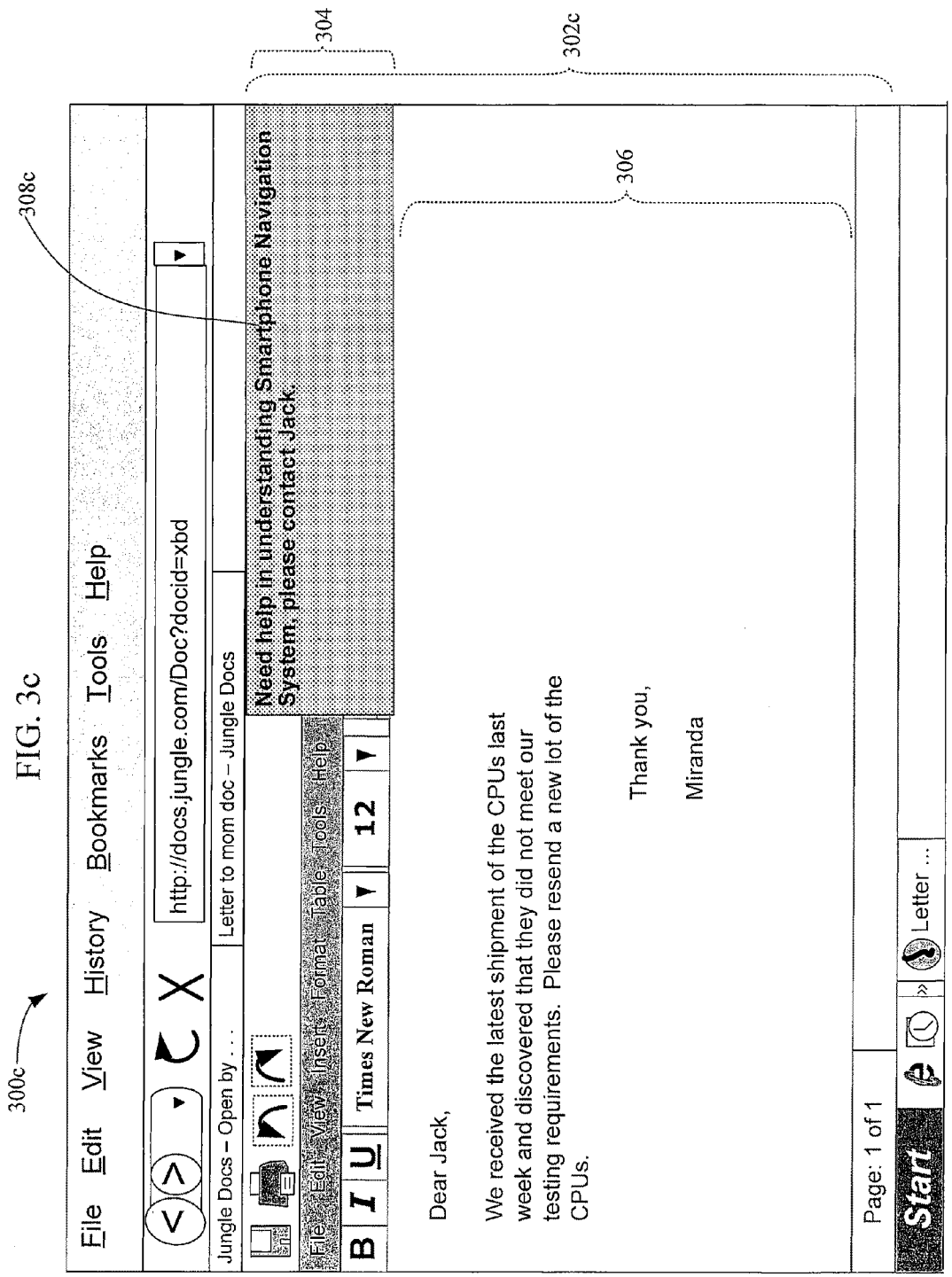

PROVIDING A MODIFIED NON-COMMUNICATION APPLICATION INTERFACE FOR PRESENTING A MESSAGE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.
Related Applications:

For purposes of the USPTO extra-statutory requirements, the present application constitutes a continuation-in-part of U.S. patent application Ser. No. 12/660,526, entitled PROVIDING A MODIFIED NON-COMMUNICATION APPLICATION INTERFACE FOR PRESENTING A MESSAGE, naming Edward K.Y. Jung; Eric C. Leuthardt; Royce A. Levien; Richard T. Lord; Robert W. Lord; Mark A. Malamud; John D. Rinaldo, Jr.; Lowell L. Wood, Jr. as inventors, filed Feb.26, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A computationally implemented method includes, but is not limited to determining which of a plurality of end users are to be presented with a message, the plurality of end users having access to one or more non-communication applications through one or more non-communication application interfaces; and providing a modified non-communication application interface for accessing at least one of the one or more non-communication applications to one or more end users who have been determined to be presented with the message, the modified non-communication application interface including at least a channel to access the message. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for determining which of a plurality of end users are to be presented with a message, the plurality of end users having access to one or more non-communication applications through one or more non-communication application interfaces; and means for providing a modified non-communication application interface for accessing at least one of the one or more non-communication applications to one or more end users who have been determined to be presented with the message, the modified non-communication application interface including at least a channel to access the message. In addition to the foregoing, other system aspects are described in the claims, drawings, and text forming a part of the present disclosure.

A computationally implemented system includes, but is not limited to: circuitry for determining which of a plurality of end users are to be presented with a message, the plurality of end users having access to one or more non-communication applications through one or more non-communication application interfaces; and circuitry for providing a modified non-communication application interface for accessing at least one of the one or more non-communication applications to one or more end users who have been determined to be presented with the message, the modified non-communication application interface including at least a channel to access the message. In addition to the foregoing, other system aspects are described in the claims, drawings, and text forming a part of the present disclosure.

A computer program product including a signal-bearing medium bearing one or more instructions for determining which of a plurality of end users are to be presented with a message, the plurality of end users having access to one or more non-communication applications through one or more non-communication application interfaces; and one or more instructions for providing a modified non-communication application interface for accessing at least one of the one or more non-communication applications to one or more end users who have been determined to be presented with the message, the modified non-communication application interface including at least a channel to access the message. In addition to the foregoing, other computer program product aspects are described in the claims, drawings, and text forming a part of the present disclosure.

A method for providing a modified non-communication application interface that includes a channel for accessing a message, the method includes determining which of a plurality of end users are to be presented with a message, the plurality of end users having access to one or more non-communication applications through one or more non-communication application interfaces; and providing, using a processor, a modified non-communication application interface for accessing at least one of the one or more non-communication applications to one or more end users who have been determined to be presented with the message, the modified non-communication application interface including at least a channel to access the message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3c shows another implementation of another modified web-based non-communication application interface as displayed on a display screen.

DETAILED DESCRIPTION

Figure 1A:
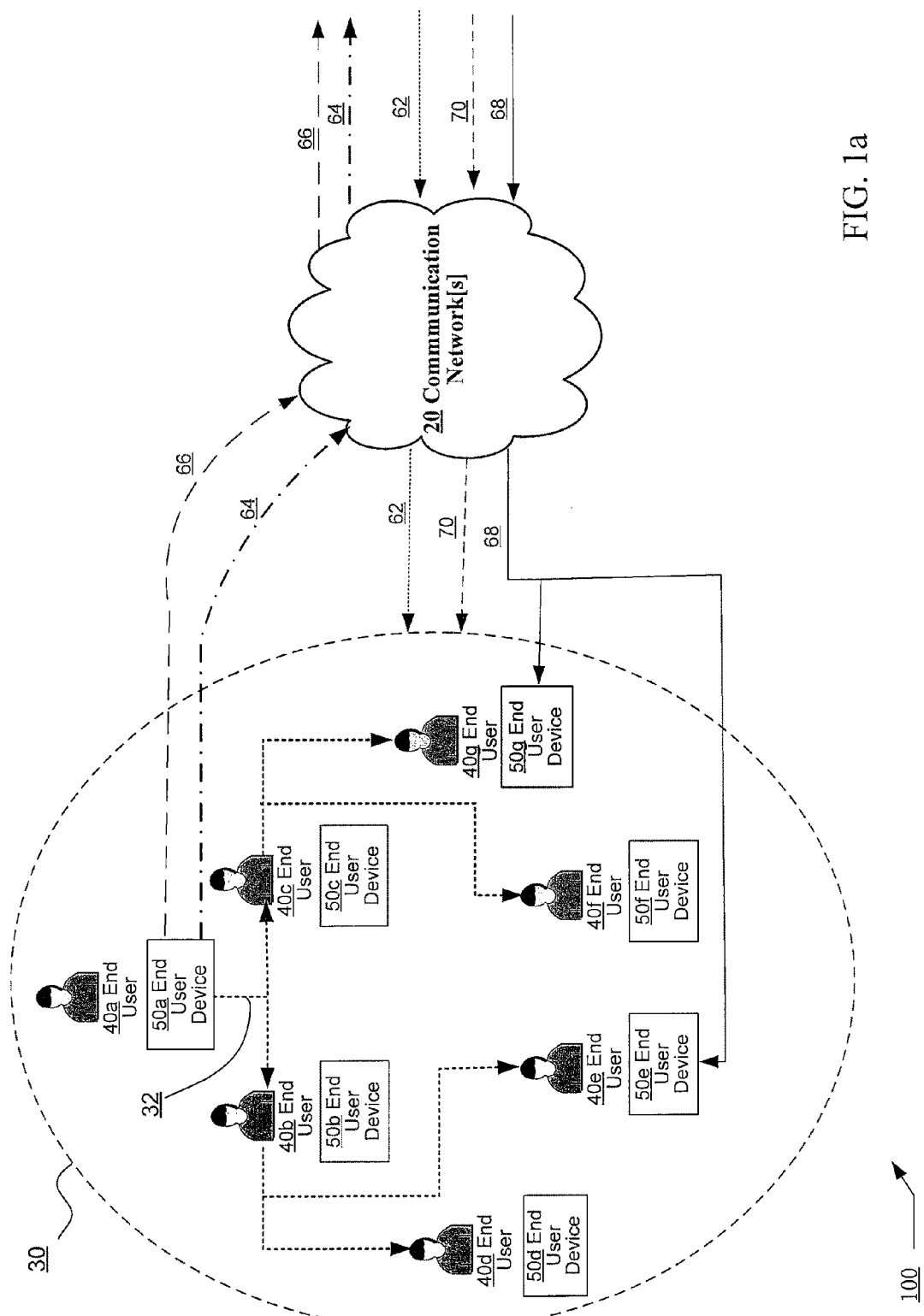
FIGS. 1a and 1b show a high-level block diagram of a Computing System 10 operating in a network environment.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Since the introduction and the subsequent integration of personal computers into the workplace, certain software programs that run on such devices have proven to be invaluable for having a productive and efficient workplace. For example, certain software programs commonly referred to as "productivity software" or "productivity applications" have become indispensable tools for many of today's businesses. There are currently a number of productivity applications available on the market including, for example, word processors, spreadsheets, presentations programs, database management programs, graphics or diagramming programs, communication programs and/or email clients, and so forth. These productivity applications may be categorized into at least two groups, one group of productivity applications that can perform communication functionalities, and a second group of productivity applications that do not generally perform communication applications but instead are designed to perform other functionalities. Examples of productivity applications that belong to the first group (e.g., "communication" productivity applications) include, for example, personal information manager applications (e.g., Microsoft Outlook) and email clients (e.g., Hotmail, Gmail, etc.). Examples of productivity applications that belong to the second group (i.e., "non-communication" productivity applications) include word processors (e.g., Microsoft Word, Apple's Pages, and WordPerfect), spreadsheets (e.g., Apple's Numbers and Microsoft Excel), presentation programs (e.g., Microsoft PowerPoint and Apple's Keynote), diagramming programs (e.g., Microsoft Visio), and so forth.

The most well-known suite of productivity applications is Microsoft's Office, which includes, among other things, Microsoft Word (a word processing application), Microsoft Excel (a spreadsheet), Microsoft PowerPoint (e.g. a presentation application), and so forth. For a number of years, such productivity applications were generally provided to end users via CD disks or via downloads from the Internet. Once downloaded from a CD disk or from the Internet, a productivity application would reside in and be entirely executed at a client device.

In recent years, a number of companies have begun offering a variety of software programs including productivity applications through "cloud computing." In cloud computing, software programs may not be stored and executed at an end user's client device but instead, may reside on the Internet. That is, in cloud computing a number of network devices including a number of computers, servers, and/or data storage systems that may be located at multiple network sites may be employed in order to store, maintain, and execute software programs. About the only thing that client devices of end users may need to have in order to utilize a software application (e.g., productivity application) is an application interface for accessing the software application. Such application interfaces are typically provided by the company providing the "web-based" software application.

In some cases, these web-based applications that are available through the Internet may be provided to end users for free (e.g., without any fee being charged for usage). For example, search giant Google provides a suite of productivity applications called "Docs" for free. Since Google currently does not charge a fee to end users for using their web-based productivity applications, Google generates their revenue by other means such as through advertising. Although web-based productivity applications, such as those included in Google Docs, are fully functional productivity applications, these applications tend to have less features and less functionalities than their "pay-for" counterparts (e.g., those productivity applications that are only available through purchase such as the productivity applications included in Microsoft Office).

As a result, the current perception of these free web-based productivity applications are that although these applications are functional, they are "not as good" as their pay-for counterparts. For this reason as well as for security concerns (e.g., these web-based productivity applications require the processing and/or storage of data at third party servers), the adoption of these free web-based productivity applications for use by enterprises (e.g., companies, businesses, organizations, clubs, and so forth) has been slow and somewhat limited.

In accordance with various embodiments, methods, systems, circuitry, and computer program products that are designed to, among other things, allow members of an enterprise, an enterprise group, the enterprise itself, or a third party to communicate with one or more selective members of the enterprise by providing to the one or more selective members a modified interface of a non-communication application that includes a channel for communicating with the one or more selective members of the enterprise. In some embodiments, the modified interface to be provided to the one or more selective end users may be the modified interface of a web-based non-communication productivity application. In some cases, such a modified interface may include at least a channel for accessing a message from the members of the enterprise, the enterprise group, the enterprise itself, or from a third party such as an advertiser.

Figure 1B:
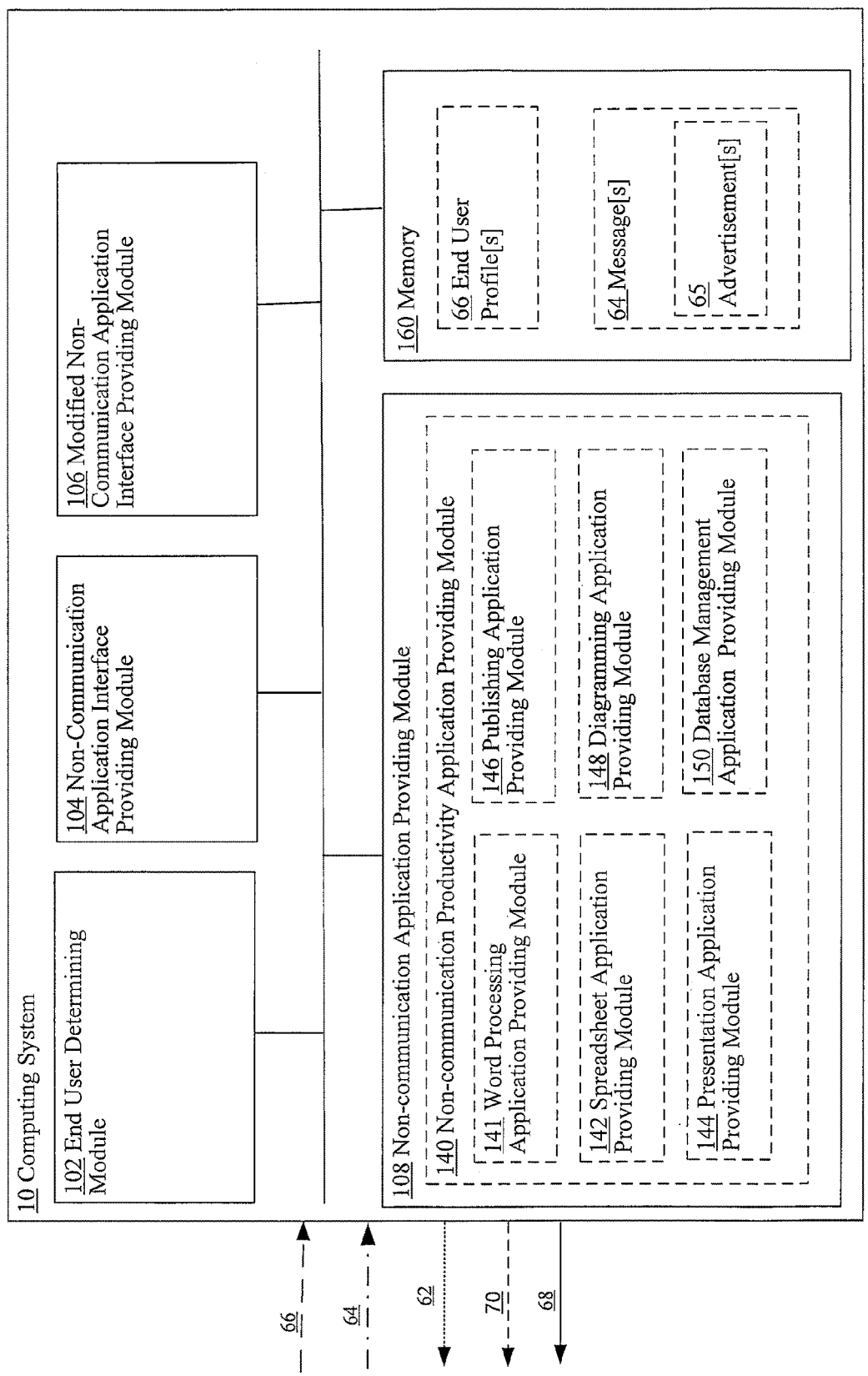

Turning now to FIGS. 1a, and 1b illustrating an example environment 100 in which the methods, systems, circuitry, and computer program products in accordance with various embodiments may be implemented by a computing system 10. In some embodiments, the computing system 10 may be a network device such as a server. Alternatively, the computing system 10 may be a plurality of network devices such as a plurality of network computers, servers, and storage devices.

In various embodiments, the computing system 10 may provide access to one or more non-communication applications such as one or more non-communication productivity applications (e.g., word processing application, spreadsheet application, presentation application, and so forth) to a group of end users 40* by initially providing one or more non-communication application interfaces 62 to the one or more end users 40*. Note that in the following "*" represents a wildcard. Thus, references to end users 40* is in reference to, for example, end user 40a, end user 40b, end user 40c, end user 40d, end user 40e, end user 40f, and/or end user 40g. The group of end users 40* may be associated with or may be members of an enterprise 30 (e.g., a business enterprise such as a company or corporation, a profit or non-profit organization, a social or athletic club, and so forth). Note that although not depicted the computing system 10 may also provide access to the one or more non-communication applications to end users 40* who are not affiliated with or are not associated with the enterprise 30. In some cases, the enterprise 30 may at least be partly defined by a hierarchical structure. For instance, and as illustration, ref 32 of FIG. 1a indicates exemplary hierarchical relationships between members (e.g., end users 40*) of the enterprise 30.

The one or more non-communication application interfaces 62 to be provided to the plurality of end users 40* may be for accessing (e.g., using or employing) one or more non-communication applications that are associated with the one or more non-communication application interfaces 62. In some cases, the one or more non-communication applications may be one or more non-communication productivity applications such as a word processing application, a spreadsheet application, a presentation application, a publishing application, a diagramming application, a data management application, a document management application, an accounting application, and/or a project management application.

As illustrated in FIGS. 1a and 1b, the one or more non-communication application interfaces 62 to be provided to the plurality of end users 40* may be provided to one or more end user devices 50* associated with the end users 40*. The one or more end user devices 50* being client devices such as desktop computers, laptop computers, Netbook, Smartphones, and so forth. In various embodiments, the computing system 10 may provide the one or more non-communication application interfaces 62 to the plurality of end users 40* via one or more communication networks 20 The one or more communication networks 20 may include, for example, a local area network (LAN), metropolitan area network (MAN), a wireless local area network (WLAN), a personal area network (PAN), a Worldwide Interoperability for Microwave Access (WiMAX), public switched telephone network (PTSN), general packet radio service (GPRS), a cellular, and so forth. In some embodiments, the one or more non-communication application interfaces 62 may be provided to the plurality of end users 40* via the Internet. The one or more non-communication application interfaces 62 to be provided to the plurality of end users 40* may be in the form of one or more display interfaces (e.g., interfaces that may be displayed through a display monitor or a touchscreen) and/or one or more audio interfaces (e.g., as provided through one or more microphones and one or more speakers).

Figure 3A:
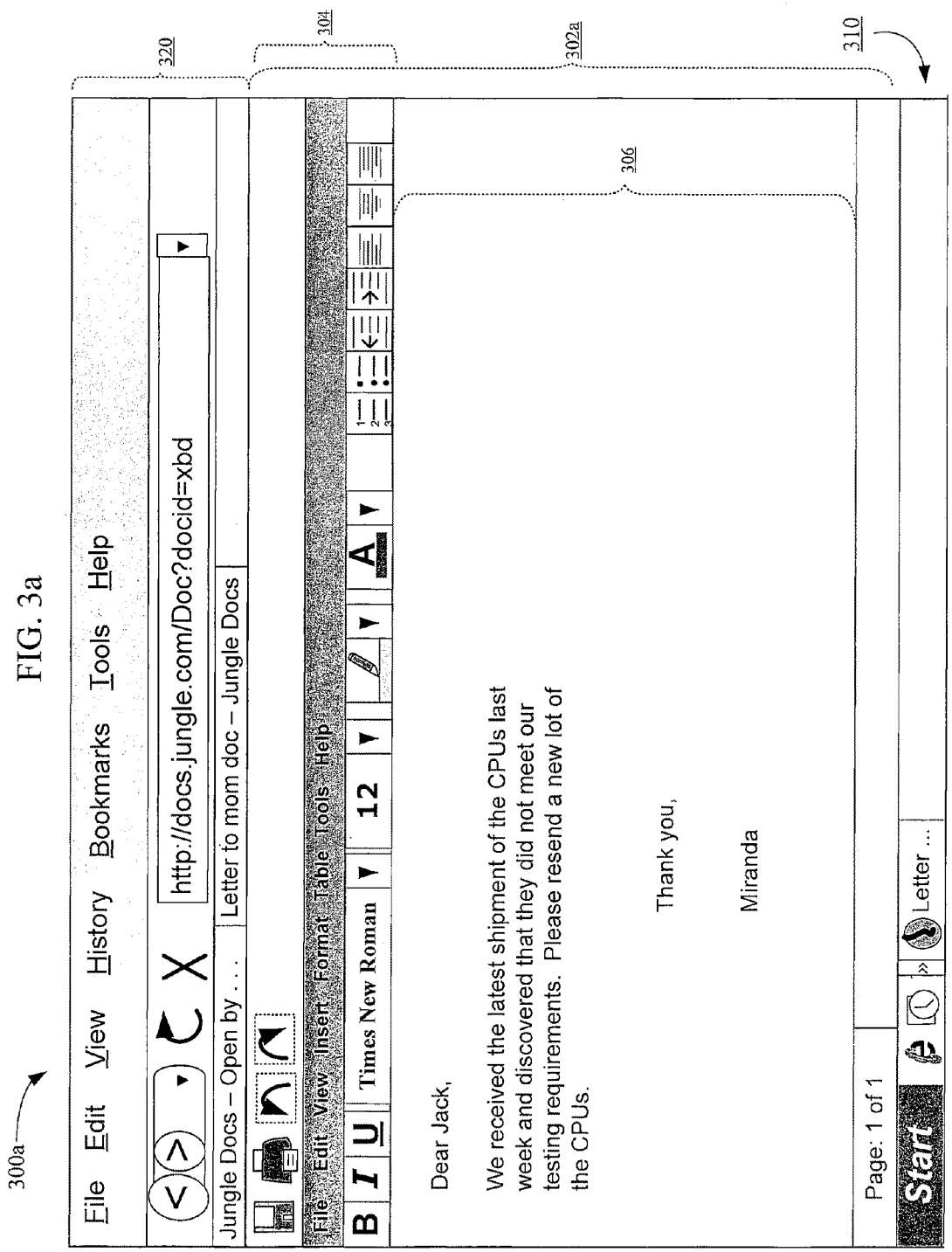
FIG. 3a shows a conventional web-based non-communication application interface as displayed on a display screen.

FIG. 3a illustrates an exemplary non-communication application interface 62 in the form of a display interface 302 presented on a display screen 300a. In the illustrated example, the display screen 300a includes a non-communication productivity application interface 62 in the form of a display interface 302a. In this example, the display interface 302a is the interface for a non-communication productivity application which, in this example, is a word processing application. At the bottom of the display monitor screen 300a is the operating system's status bar 310, while at the top of the computer monitor display 300a is a web-browser tool/status bar 320.

The display interface 302a includes two portions, a tool bar portion 304 and a workspace portion 306. The tool bar portion 304 includes various functional/command icons to, among other things, execute various commands and functionalities. In some cases, the tool bar portion 304 may also be a tool bar/status bar. The workspace portion 306 is the portion of the display interface 302a through which, for example, an end user 40* may enter data, view the entered data, and/or to receive and/or view the resulting processed data. In the example illustrated in FIG. 3a, the display interface 302a is being employed in order to draft a letter. Note that although the display interfaces of other non-communication productivity applications (e.g., spreadsheet applications, presentation applications, data management applications, diagramming applications, and so forth) are not illustrated in the following, the display interfaces of the other non-communication productivity applications will generally comprise of at least a tool bar portion 304 and a workspace portion 306. For example, the display interfaces for a spreadsheet application, a diagramming application, a presentation application, and so forth will all have at least a tool bar portion 304 and a workspace portion 306.

Referring back to FIGS. 1a and 1b, once the computing system 10 has provided one or more non-communication application interfaces 62 to the plurality of end users 40*, the computing system 10 may allow the plurality of end users 40* to access the applications (e.g., productivity or some other types of applications) that are associated with the one or more non-communication application interfaces 62 via the one or more non-communication application interfaces 62.

In addition to providing the one or more non-communication application interfaces 62 to the plurality of end users 40* and allowing the end users 40* to access the corresponding non-communication applications, the computing system 10 as will be further described herein may be designed to provide access to one or more messages 64 to selective end users 40* via modified non-communication application interfaces 68. In particular, the computing system 10 may be designed to initially determine which of a plurality of end users 40* should be presented with a message 64 that may be provided by a member of the enterprise 30 (e.g., end user 40a in the example illustrated in FIGS. 1a and 1b), by an enterprise group associated with the enterprise 30 (e.g., human resource department of the enterprise, a project group, or an interest group), or by a third party (e.g., an advertiser). Note that in some cases, the message 64 may be retrieved from a memory 160 while in other cases the message 64 may be received from the originator (e.g., end user 40a) of the message 64.

The determination as to which end users 40* should be provided access (e.g., receive) the message 64 may be based on a number of factors. For example, in some embodiments, such a determination may be made by identifying those end users 40* who have characteristics that match with characteristics indicated by an end user profile 66 that indicate the user characteristics of end users 40* who should be presented with the message 64. The end user profile 66 may merely be a collection of user characteristics and may indicate a variety of user characteristics including, for example, user interests, user background, user job title or position, user gender or sexual orientation, user ethnicity or age group, and so forth. An end user profile 66 may be obtained from a number of different sources. For example, in some embodiments, an end user profile 66 may be provided by the originator of the message 64, by an enterprise group (e.g., HR department), or by a member of the enterprise 30 other than the originator of the message 64 who may have an interest in who receives the message 64.

In order to determine which end users 40* has characteristics that match the characteristics indicated by the end user profile 66, a various aspects associated with the end users 40* may be considered by the computing system 10. For example, in some embodiments, the computing system 10 may be designed to consider (e. g, compare) the end user profile 66 and computer usage (e.g., patterns of computer use) of the end users 40* in order to determine who should have access to the message 64. In some cases, this may mean looking at research activities such as Internet search activities of the end users 40* to determine, for example, the interests of the end users 40*, and to see if the interests of the end users 40* matches or aligns with interests that may be relevant to the message 64 and which may be indicated by the end user profile 66.

In some embodiments, the computing system 10 may consider content of work products generated by the end users 40* in order to determine which of the end users 40* has characteristics that match with characteristics indicated by the end user profile 66. In some cases, the work products that may be considered may have been as a result of the end users 40* using non-communication productivity applications provided by the computing system 10. Examples of work products that may be considered include, for example, letters, reports, financial statements, accounting documents, diagrams, schematics, and/or any other documents/data generated by end users 40*.

Alternatively or in the same embodiments, the computing system 10 may consider content of communication messages associated with the end users 40* in order to determine which of the end users 40* has characteristics that match with characteristics indicated by the end user profile 66. Communication messages that may be considered include, for example, any communication messages to be received or transmitted by the end users 40* including, for example, emails, text messages, instant messages (IMs), audio or voice messages, and so forth. By examining the content of such communication messages, a determination may be made by the computing system 10 as to which end users 40* has characteristics that match the characteristics indicated by the end user profile 66*.

When looking at the content of communication messages and/or work products associated with the end users 40*, the computing system 10 may make a determination as to whether any of the communication messages and/or work products associated with the end users 40* contain specific words, phrases, numbers, symbols, icons, and so forth, in order to determine which of the end users 40* has characteristics that match the characteristics indicated by the end user profile 66. For example, and as an illustration, suppose the message 64 is an advertisement directed to senior citizens, and the end user profile 66 indicates an age group of over 50 years of age, then the computing system 10 may look for acronyms like AARP (American Association of Retired Persons), or phrases like "gray hair" or words like "arthritis" in the communication messages and/or work products associated with the end users 40* to determine which end users 40* should be presented with the message 64. In yet another example, suppose the message 64 is a message from a member (e.g., end user 40a) of the enterprise 30 requesting information on Smartphones, then the computing system 10 may look for certain words and phrases such as "iPhone," "text messaging," "3G," "iPhone Apps," "ATT," "Verizon," and so forth, in the communication messages and/or work products associated with the end users 40* to determine which end users 40* should be presented with the message 64.

In some alternative embodiments, the computing system 10 may employ other means for determining which plurality of end users 40* should be presented with a message 64. For example, in some embodiments, the computing system 10 may be designed to solicit from the enterprise 30 associated with the plurality of end users 40* identities of end users 40* who have characteristics that match with characteristics indicated by the end user profile 66. Such an operation may involve, in some cases, the computing system 10 soliciting to an organizational unit (e.g., HR department) of the enterprise 30 or to a specific member or end user 40* of the enterprise 30 identities of those end users 40* who have characteristics that match the characteristics indicated by the end user profile 66. In order to solicit for such information, the computing system 10 may transmit one or more solicitations 70 via one or more communication networks 20. Such solicitations 70 may seek the identities of end users 40* based on their position in the enterprise hierarchy, based on their interests, based on their background, and/or based on other aspects of the end users 40*.

Referring back to the exemplary environment 100 of FIGS. 1a and 1b, once the computing system 10 identifies which of the plurality of end users 40* are to be presented with the message 64, the computing system 10 may be designed to provide a modified non-communication application interface 68 for accessing a non-communication application that is associated with the modified interface 68 to one or more end users 40* (e.g., end user 40e and end user 40g in the example illustrated in FIG. 1a) who have been determined that they should be presented with the message 64, the modified non-communication application interface 68 to be provided including at least a channel to access a message 64.

As illustrated in FIGS. 1a and 1b, the modified non-communication application interface 68 (which may be a modified non-communication productivity application interface) may be provided to the "determined" one or more end users 40* (those end users 40* such as end user 40e and 40g in the example illustrated in FIGS. 1a and 1b who have been determined that they should be presented with the message 64) via one or more communication networks 20. In some cases, the modified non-communication application interface 68 may be provided to the determined one or more end users 40* via the Internet. In order to provide the modified non-communication application interface 68 to the determined one or more end users 40*, the computing system 10 may be designed to provide the modified non-communication application interface 68 to one or more local end user devices 50* (note that in FIG. 1a, the "local" end user devices 50* are simply shown as "end user devices 50*") associated with the determined one or more end users 40*.

The modified non-communication application interface 68 that may be provided to the determined one or more end users 40* may, in some cases, replace a (unmodified) non-communication application interface 62 that was previously provided by the computing system 10. In some embodiments, the non-communication application interface 62 to be replaced may have been a non-communication productivity application interface. Similarly, the modified non-communication application interface 68 to be provided may be a modified non-communication productivity application interface.

The modified non-communication application interface 68 that may be provided by the computing system 10 may be provided in a variety of forms including in audio form and/or in visual form. For example, FIGS. 3b, 3c, 3d, and 3e illustrate four alternative implementations of the modified non-communication application interface 68 in the form of modified display interfaces 302b, 302c, 302d, and 302e. In particular, FIGS. 3b, 3c, 3d, and 3e shows modified versions of the display interface 302a illustrated in FIG. 3a where the modified versions (e.g., display interfaces 302b, 302c, 302d, and 302e in FIGS. 3b, 3c, 3d, and 3e) of the display interface 302a (as illustrated in FIG. 3a) include channels, in the form of windows 308*, for accessing (e.g., viewing) a message 64. Note that the display interfaces 302b, 302c, 302d, and 302e in FIGS. 3b, 3c, 3d, and 3e may be the interfaces for a web-based word processing application.

In some embodiments, the windows 308* of the display interfaces 302b, 302c, 302d, and 302e of FIGS. 3b, 3c, 3d, and 3e may provide access to the message 64 by displaying the message 64 in the windows 308*. Alternatively, the windows 308* included in the display interfaces 302b, 302c, 302d, and 302e of FIGS. 3b, 3c, 3d, and 3e may provide access to the message 64 by including a link such as a URL address or a hyperlink in the windows 308* to access the content of the message 64.

Figure 3B:
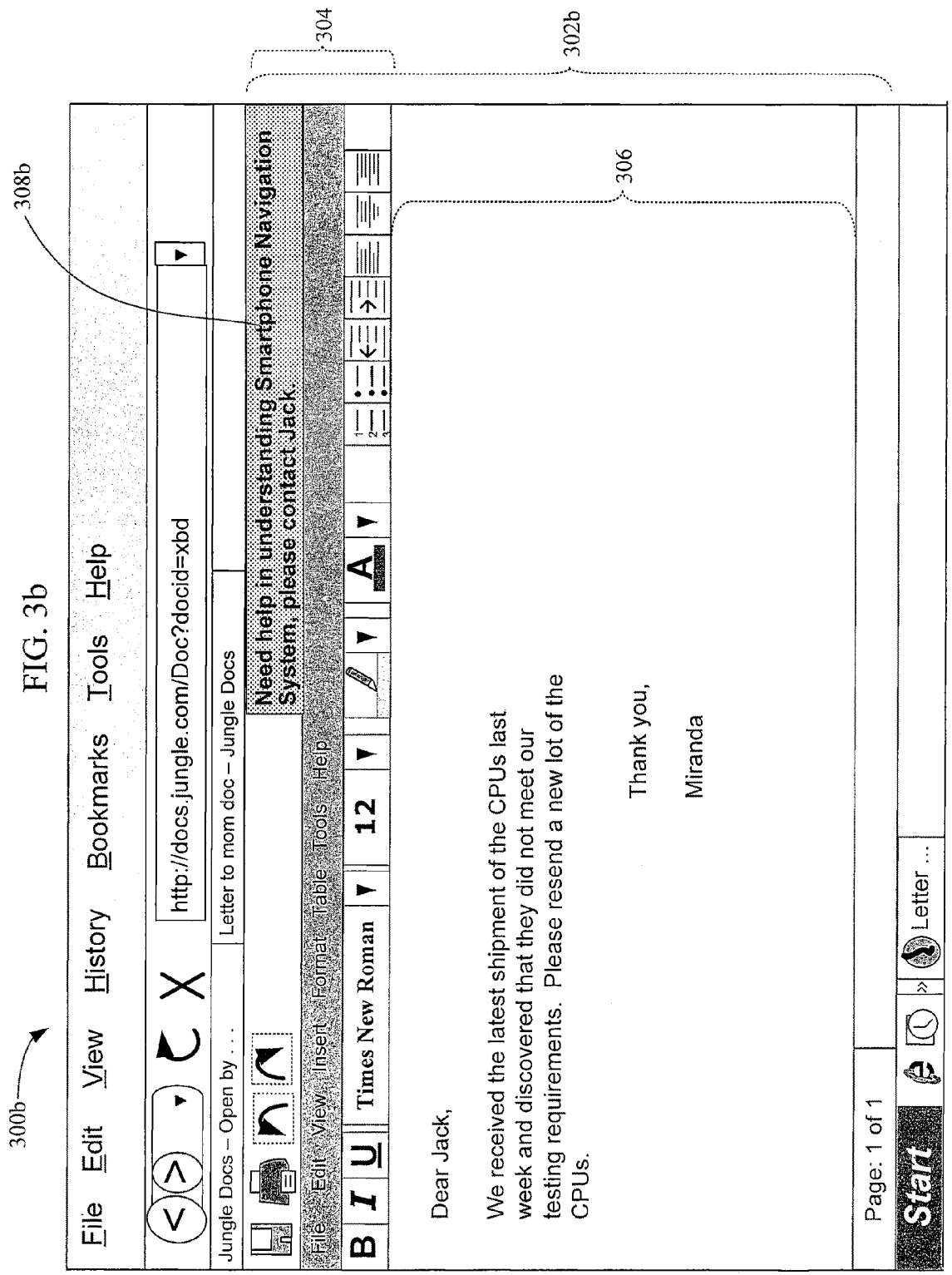
FIG. 3b shows one implementation of a modified web-based non-communication application interface as displayed on a display screen.

Turning particularly now to FIG. 3b illustrating an example modified non-communication application interface 68 in the form of a display interface 302b being displayed on a display screen 300b. For this embodiment, the window 308b for accessing the message 64 may be completely disposed within the tool-bar portion 304 of the display interface 302b at a location on the tool-bar portion 304 that does not displace any of the functional/command icons and/or status indicators included in the tool bar portion 304. In some cases, the window 308b may occupy a portion of the display interface 302b that may be dedicated for messages 64. In other words, window 308b may be located at an unused portion of the tool-bar portion 304 of the display interface 302b.

FIG. 3c, in contrast, illustrates an example modified non-communication application interface 68 in the form of a display interface 302c that includes a window 308c for accessing the message 64 and that is also completely disposed within the tool-bar portion 304 of the display interface 302c. However, and unlike the window 308b of FIG. 3b, the window 308c in FIG. 3c displaces or "covers" some of the functional/command icons and/or status indicators of the "original" tool bar portion 304 as shown in FIG. 3a.

Figure 3D:
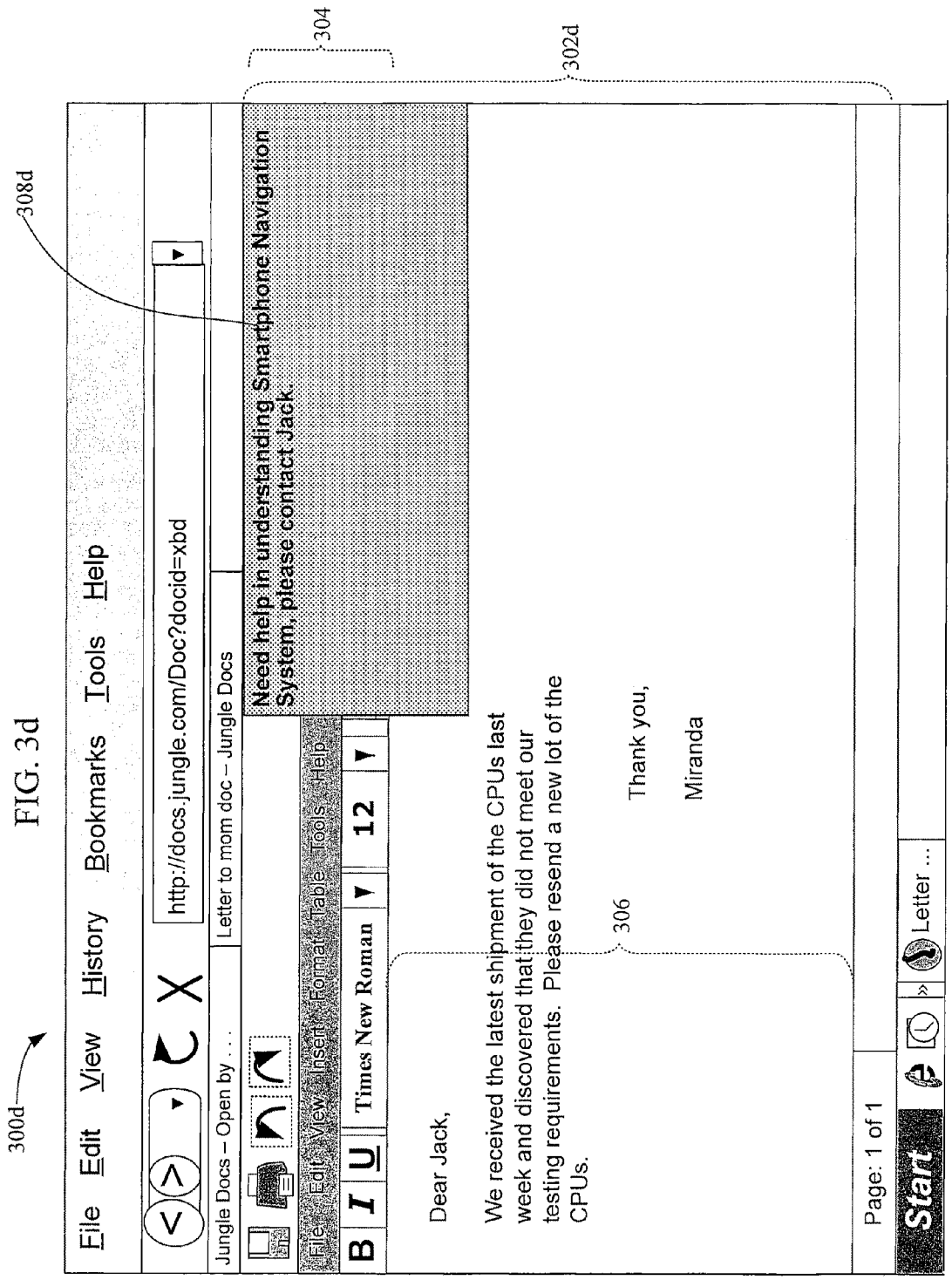
FIG. 3d shows another implementation of another modified web-based non-communication application interface as displayed on a display screen.
Figure 3E:
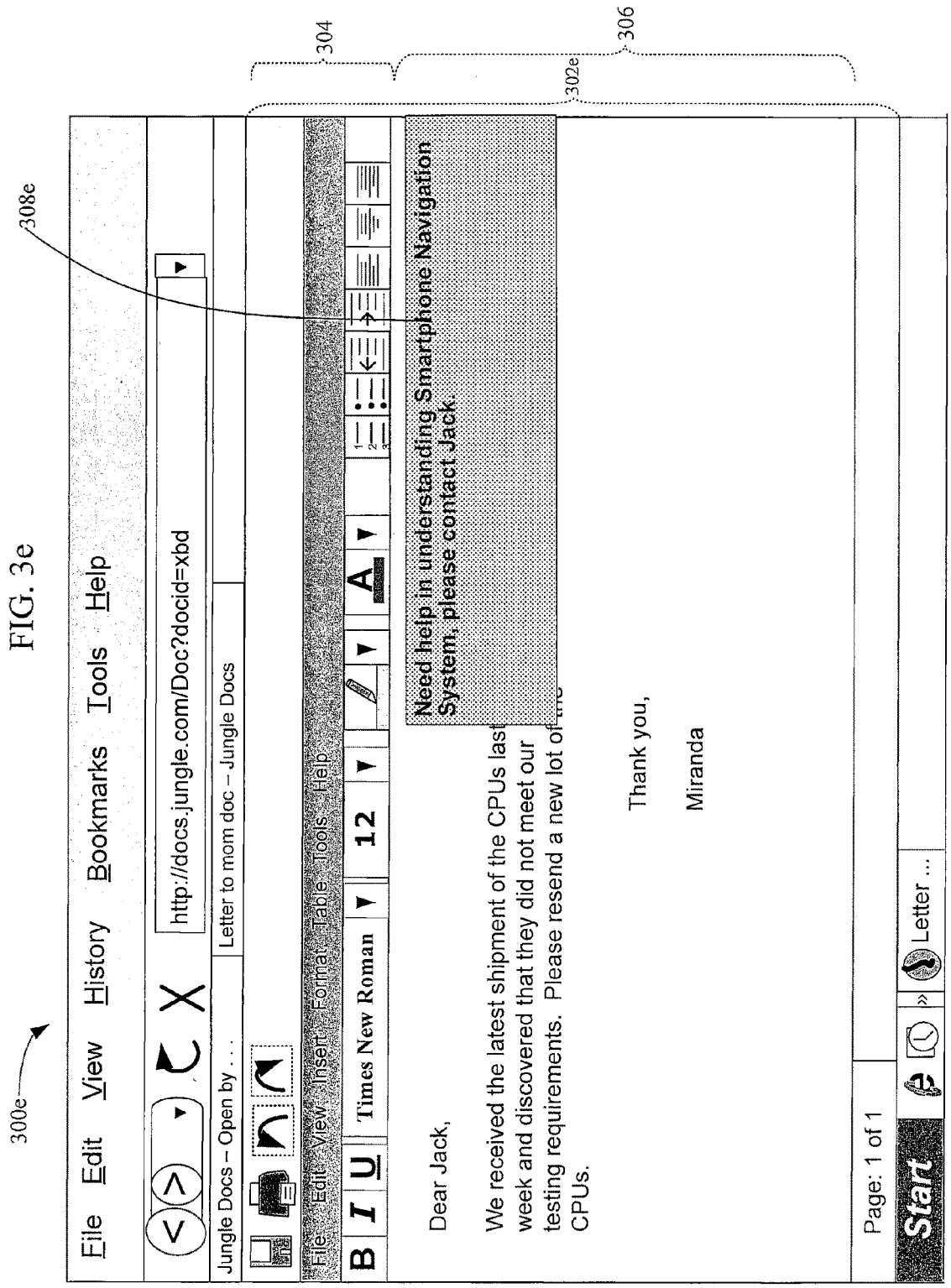
FIG. 3e shows another implementation of another modified web-based non-communication application interface as displayed on a display screen.

FIG. 3d illustrates another example modified non-communication application interface 68 in the form of a display interface 302d that includes a window 308d for accessing the message 64 and that is disposed on both the tool-bar portion 304 and the workspace portion 306 of the display interface 302d. Turning now to FIG. 3e, which illustrates still another example modified non-communication application interface 68 in the form of a display interface 302e that includes a window 308e for accessing the message 64 and that is disposed only on the workspace portion 306 of the display interface 302e.

As illustrated in FIG. 1b, the computing system 10 may include a variety of modules, sub-modules, and various other components. The computing system 10 in some embodiments may be a single network device such as a single network computer, a single server, a single workstation, and so forth. Alternatively, the computing system 10 may be a collection of network devices including a collection of one or more servers, one or more network computers, one or more storage devices and/or one or more other network devices. Thus, the computing system 10 may be implemented at a single network site or at multiple network sites.

Figure 2A:
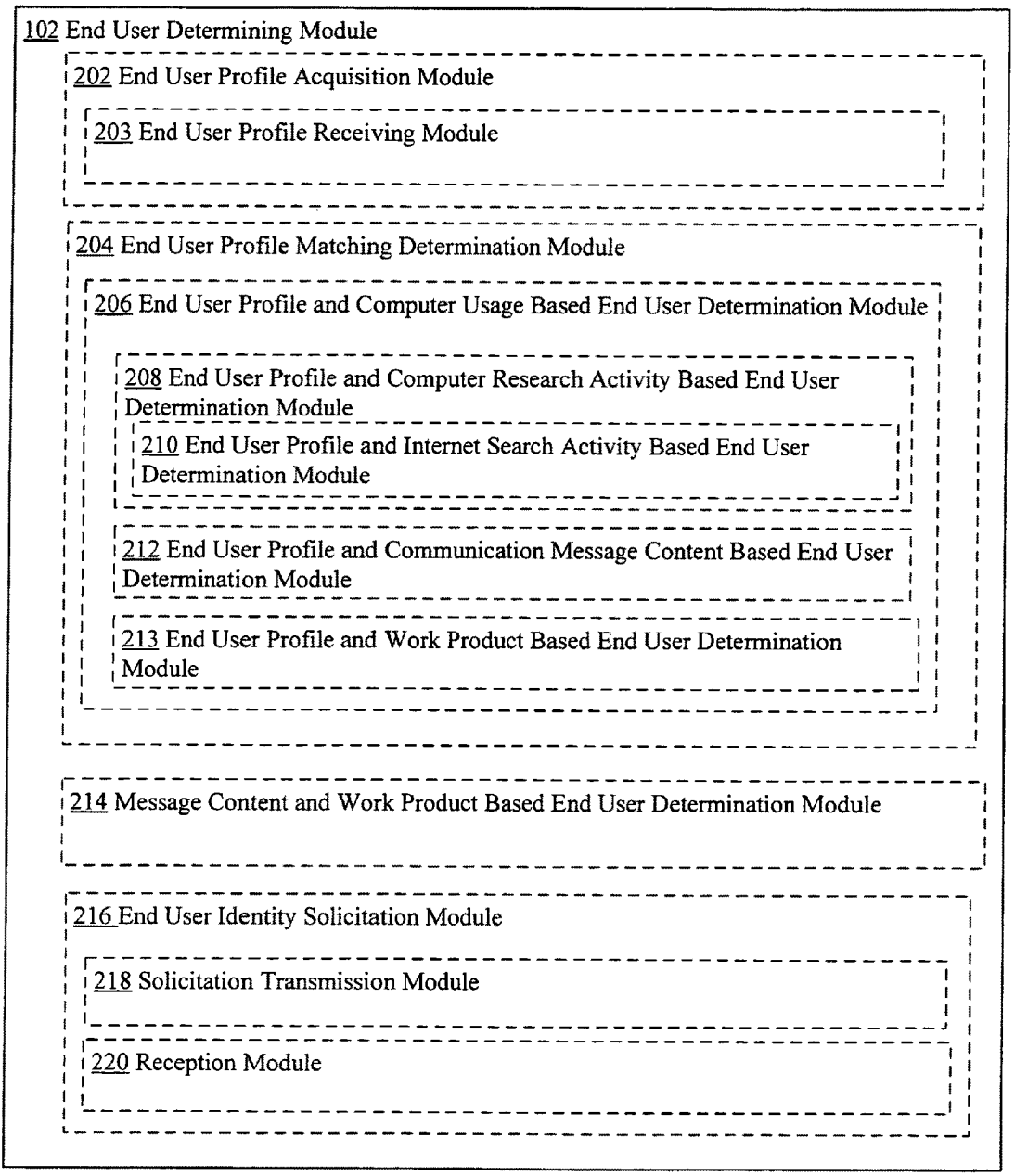
FIG. 2a shows another perspective of the End User Determining Module 102 of the Computing System 10 of FIG. 1b.
Figure 2B:
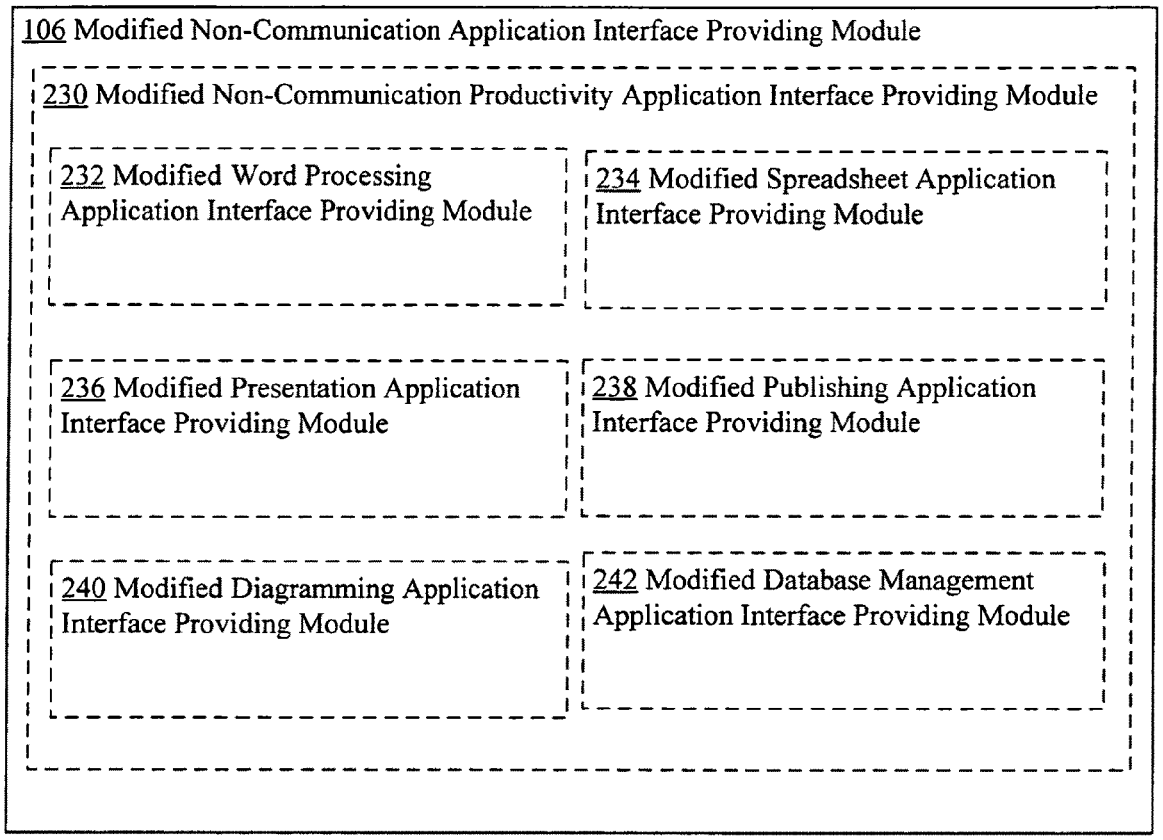
FIG. 2b shows another perspective of the Modified Non-Communication Application Interface Providing Module 106 of the Computing System 10 of FIG. 1b.

As shown, the computing system 10 may include at least an end user determining module 102 (which may further include one or more sub-modules as illustrated in FIG. 2a) and a modified non-communication application interface providing module 106 (which may further include one or more sub-modules as illustrated in FIG. 2b). In various embodiments, the computing system 10 may also include a non-communication application interface providing module 104, a non-communication application providing module 108, and a memory 160. Although not depicted, the computing system 10 may also include other additional components such as a search engine and/or a web browser server in various alternative embodiments.

In various embodiments, the end user determining module 102 may be configured to, among other things, determine (e.g., identify or deduce) which of a plurality of end users 40* are to be presented with a message 64 (e.g., determine which end users 40* should be presented with the message 64), the plurality of end users 40* having access to one or more non-communication applications through one or more non-communication application interfaces 62 (e.g., unmodified non-communication application interfaces). In contrast, the modified non-communication application interface providing module 106 may be configured to, among other things, provide (e.g., disseminate or transmit) a modified non-communication application interface 68 (e.g., provide copies of the modified non-communication application interface 68) for accessing at least one of the one or more non-communication applications to one or more end users 40* (e.g., end user 40e and end user 40g in the example illustrated in FIGS. 1a and 1b) who have been determined to be presented with the message 64, the modified non-communication application interface 68 including at least a channel to access the message 64.

The non-communication application interface providing module 104 may be configured to provide one or more non-communication application interfaces 62 (e.g., unmodified non-communication application interfaces) to a plurality of end users 40* for accessing one or more corresponding non-communication applications. In some embodiments, the one or more corresponding non-communication applications to be accessed through the one or more non-communication application interfaces 62 may be one or more non-communication productivity applications such as a word processing application, a spreadsheet application, a presentation application, a diagramming application, a database management application, a publishing application, and so forth. In some cases, the "modified non-communication application interface providing" module 106 may be part of or may be included in the "non-communication application interface providing" module 104. Note that in the following, quotation marks (e.g., "modified non-communication application interface providing" module 106) may be used with respect to the names of the modules and sub-modules of the computing system 10 for ease of illustration and understanding.

As indicated earlier, the computing system 10 may include a non-communication application providing module 108 that may be designed to provide access to one or more non-communication applications. In some cases, the access to the one or more non-communication applications may be via one or more corresponding non-communication application interfaces 62. In some embodiments, the "non-communication application providing" module 108 may further include a "non-communication productivity application providing" module 140 that is designed to provide access one or more productivity applications. The "non-communication productivity application providing" module 140 may further include one or more sub-modules for providing access to specific productivity applications including, for example, a word processing application providing module 141, a spreadsheet application providing module 142, a presentation application providing module 144, a publishing application providing module 146, a diagramming application providing module 148, and/or a database management application providing module 150. In some embodiments, the non-communication application providing module 108 and its sub-modules may be implemented using multiple servers.

In some embodiments, the computing system 10 may include a memory 160 for storing various types of data. For these embodiments, memory 160 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 160 may be located at a single network site, while in other embodiments, memory 160 may be located at multiple network sites.

In various embodiments, memory 160 may store one or more end user profiles 66 that indicate one or more end user characteristics. Such end user profiles 66, as previously described may be referenced in order to determine which end users 40* should receive which messages 64. In some cases, memory 160 may store one or more messages 64 that may have been originally provided by members (e.g., end users 40*) of an enterprise 30, by an enterprise group, or by a third party. In some cases, the one or more messages 64 stored in memory 160 may include one or more advertisements 65.

FIG. 2a illustrates a particular implementation of the end user determining module 102 of the computing system 10 of FIG. 1b. As illustrated, the end user determining module 102 may include one or more sub-modules in various alternative implementations. For example, in some implementations, the end user determining module 102 may include an end user profile acquisition module 202 (which may further include an end user profile receiving module 203), an end user profile matching determination module 204 (which may further include an end user profile and computer usage based end user determination module 206), a message content and work product based end user determination module 214, and/or an end user identity solicitation module 216 (which may further include a solicitation transmission module 218 and/or a reception module 220).

In embodiments where the end user profile matching determination module 204 includes an end user profile and computer usage based end user determination module 206, the end user profile and computer usage based end user determination module 206 may further include an end user profile and computer research activity based end user determination module 208 (which may further include an end user profile and Internet search activity based end user determination module 210), an end user profile and communication message content based end user determination module 212, and/or an end user profile and work product based end user determination module 213. Specific details related to above described sub-modules of the end user determining module 102 will be provided below with respect to the operations and processes to be described herein.

FIG. 2b illustrates a particular implementation of the modified non-communication application interface providing module 106 of the computing system 10 of FIG. 1b. As illustrated, the modified non-communication application interface providing module 106 may include one or more sub-modules in various alternative implementations. For example, in some implementations, the modified non-communication application interface providing module 106 may include at least a modified non-communication productivity application interface providing module 230, which may further include a modified word processing application interface providing module 232, a modified spreadsheet application interface providing module 234, a modified presentation application interface providing module 236, a modified publishing application interface providing module 238, a modified diagramming application interface providing module 240, and/or a modified database management application interface providing module 242. Specific details related to above described sub-modules of the modified non-communication application interface providing module 106 will be provided below with respect to the operations and processes to be described herein.

Figure 7:
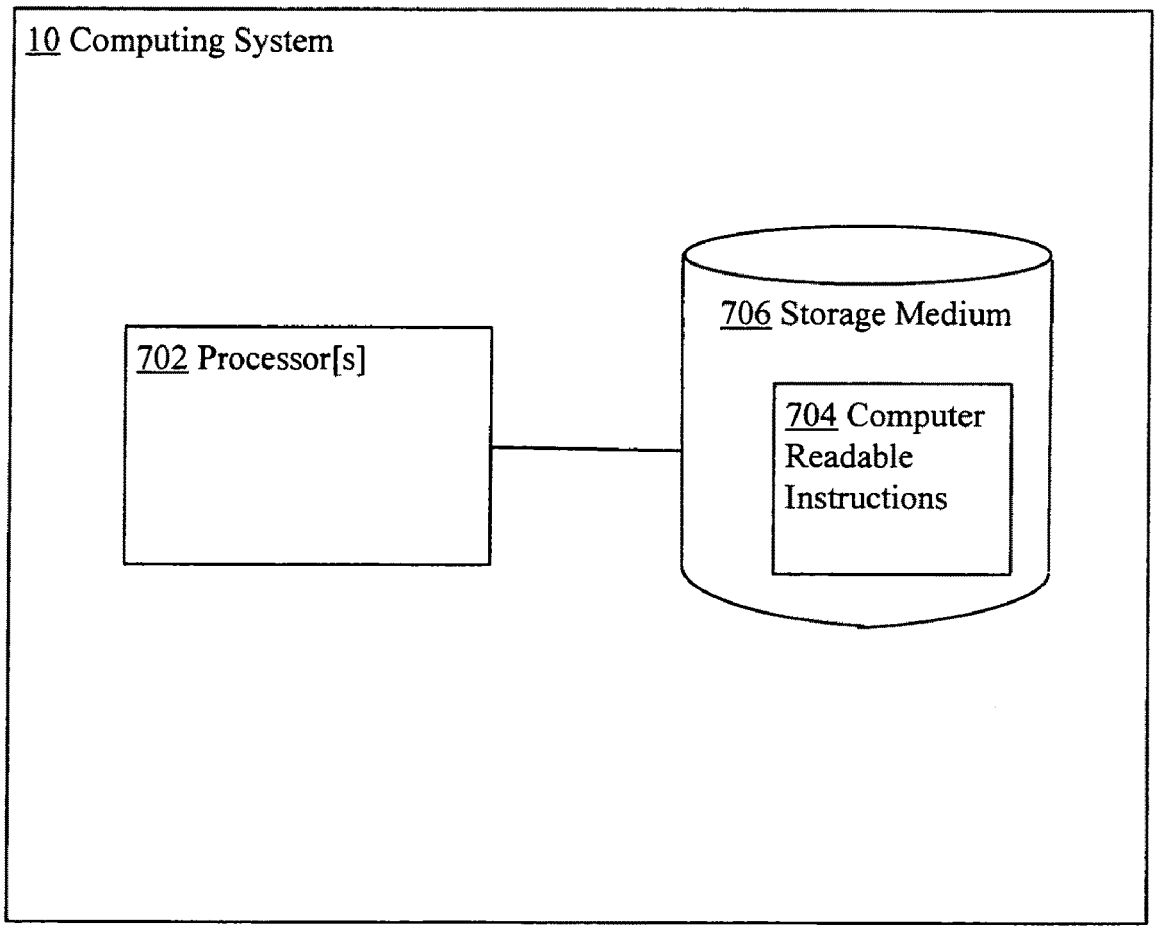
FIG. 7 is another high-level block diagram showing one implementation of the computing system 10 of FIG. 1b.

Referring back to the computing system 10 of FIG. 1b, the various modules (e.g., the end user determining module 102, the modified non-communication application interface providing module 106, and so forth) along with their sub-modules included in the computing system 10 may be implemented using hardware, software, firmware, or any combination thereof For example, in some implementations, the end user determining module 102 and/or the modified non-communication application interface providing module 106 may be implemented with one or more processors 702 (e.g., microprocessors, controllers, and so forth) executing computer readable instructions 704 (e.g., computer program product) stored in a storage medium 706 (e.g., volatile or non-volatile memory) such as a signal-bearing medium as depicted in the computing system 10 of FIG. 7. Alternatively, hardware such as circuitry including application specific integrated circuit (ASIC) may be employed in order to implement such modules in some alternative implementations. In still other alternative implementations, programmable circuitry such as field programmable gate arrays (FPGA) may be employed in order to implement such modules.

Figure 4:
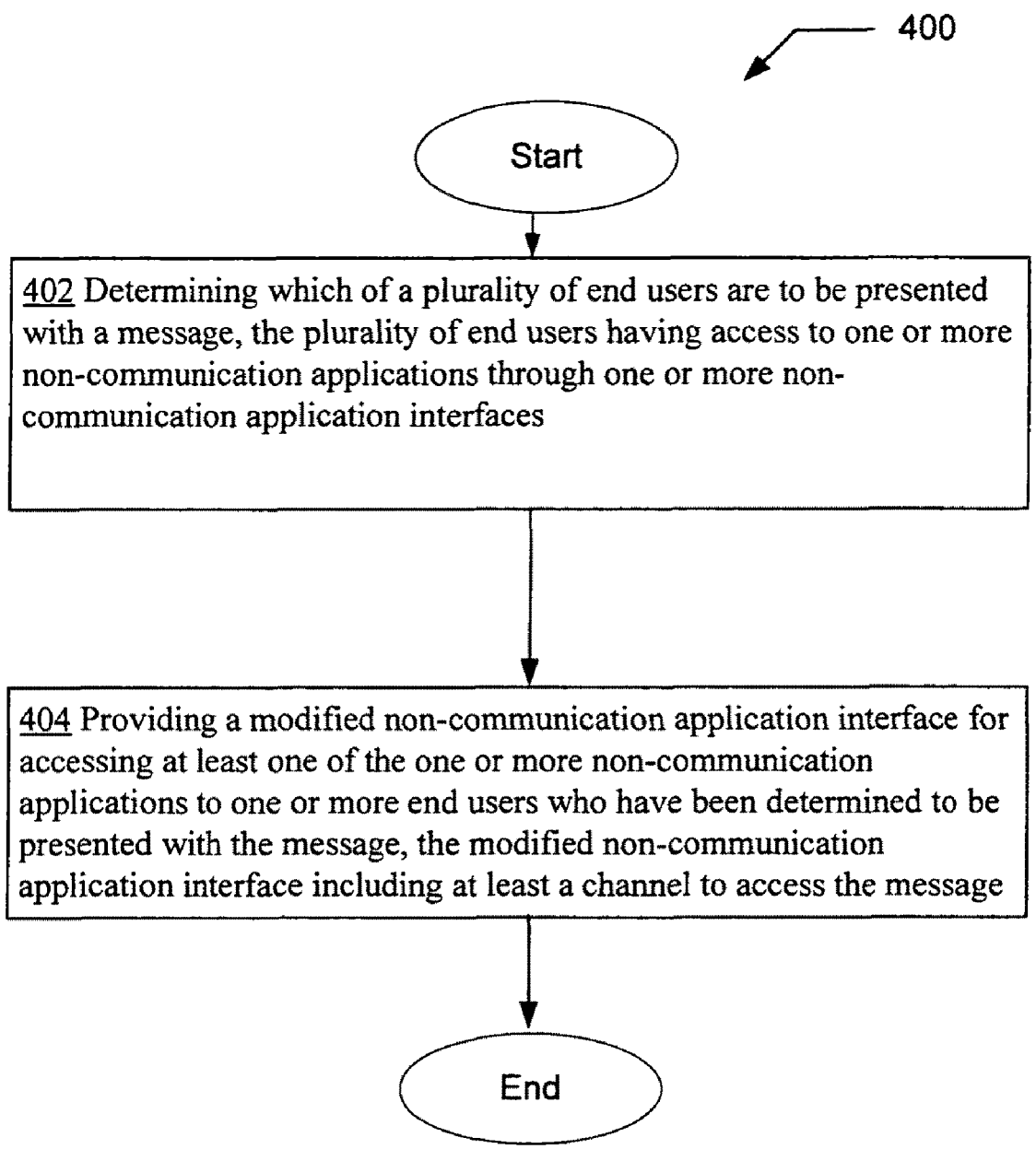
FIG. 4 is a high-level logic flowchart of a process.

A more detailed discussion related to the computing system 10 of FIG. 1b will now be provided with respect to the processes and operations to be described herein. FIG. 4 illustrates an operational flow 400 representing example operations related to, among other things, providing a modified non-communication application interface 68 to one or more end users 40*, the modified non-communication application interface 68 for accessing a non-communication application and including at least a window to access a message 64.

In FIG. 4 and in the following figures that include various examples of operational flows, discussions and explanations may be provided with respect to the exemplary environment 100 described above as illustrated in FIGS. 1a and 1b, and/or with respect to other examples (e.g., as provided in FIGS. 2a, 2b, 3a, 3b, 3c, 3d, and 3e) and contexts. However, it should be understood that the operational flows may be executed in a number of other environments and contexts, and/or in modified versions of FIGS. 1a, 1b, 2a, 2b, 3a, 3b, 3c, 3d, and 3e. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 400 may move to an end user determining operation 402 for determining which of a plurality of end users are to be presented with a message, the plurality of end users having access to one or more non-communication applications through one or more non-communication application interfaces. For instance, and as an illustration, the end user determining module 102 of the computing system 10 of FIG. 1b determining (e.g., identifying or deducing) which of a plurality of end users 40* are to be presented with a message 64, the plurality of end users 40* having access to one or more non-communication applications through one or more non-communication application interfaces 62.

In addition to the end user determining operation 402, operational flow 400 may also include a modified non-communication application interface providing operation 404 for providing a modified non-communication application interface for accessing at least one of the one or more non-communication applications to one or more end users who have been determined to be presented with the message, the modified non-communication application interface including at least a channel to access the message. For instance, the modified non-communication application interface providing module 106 of the computing system 10 of FIG. 1b providing a modified non-communication application interface 68 for accessing at least one of the one or more non-communication applications to one or more end users 40* who have been determined to be presented with the message 64, the modified non-communication application interface 68 including at least a channel to access the message 64. In other words, to provide the modified non-communication application interface 68 (e.g., to provide at least copies of the modified non-communication application interface 68) to one or more end users 40* who are to be presented with the modified non-communication application interface based on the determination made in operation 402. Note that in the example illustrated in FIGS. 1a and 1b, end users 40e and 40g are depicted as being provided with the modified non-communication application interface 68.

The end user determining operation 402 and the modified non-communication application interface providing operation 404 of FIG. 4, as described above, may be executed by the computing system 10 of FIG. 1b, which may be a network device, such as a network server, or may be a plurality of network servers. Thus, such operations may be executed at a single network site or at multiple network sites. As will be further described herein, the end user determining operation 402 and the modified non-communication application interface providing operation 404 of FIG. 4 may be executed in a variety of different ways.

Figure 5A:
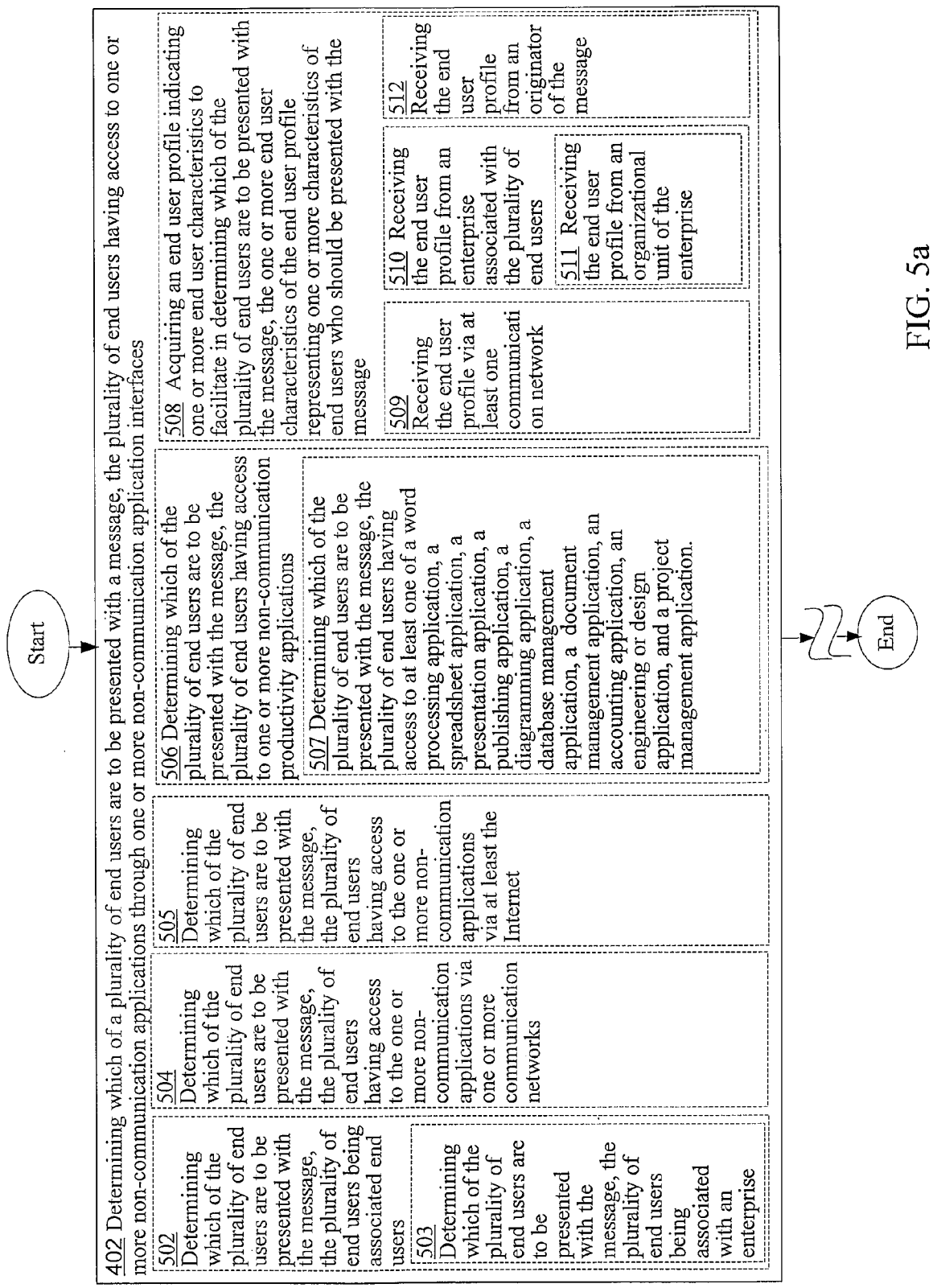
FIG. 5a is a high-level logic flowchart of a process depicting alternate implementations of the end user determining operation 402 of FIG. 4.

For example, FIGS. 5a, 5b, 5c, 5d, 5e, 5f, and 5g illustrate the various ways that the end user determining operation 402 of FIG. 4 may be executed in various alternative implementations. In some implementations, for example, the end user determining operation 402 of FIG. 4 may include an operation 502 for determining which of the plurality of end users are to be presented with the message, the plurality of end users being associated end users as depicted in FIG. 5a. For instance, the end user determining module 102 of the computing system 10 of FIG. 1b determining which of the plurality of end users 40* are to be presented with the message 64, the plurality of end users 40* being associated end users (e.g., end users 40* who are members of a group, a common class, or an organization).

In some cases, operation 502 may further include an operation 503 for determining which of the plurality of end users are to be presented with the message, the plurality of end users being associated with an enterprise as further depicted in FIG. 5a. For instance, the end user determining module 102 of the computing system 10 of FIG. 1b determining which of the plurality of end users 40* are to be presented with the message 64, the plurality of end users 40* being associated with an enterprise 30 (e.g., a company, an organization, an affiliated group of end users 40* having a common interest or traits, and so forth).

In some implementations, the end user determining operation 402 of FIG. 4 may include an operation 504 for determining which of the plurality of end users are to be presented with the message, the plurality of end users having access to the one or more non-communication applications via one or more communication networks as further depicted in FIG. 5a. For instance, the end user determining module 102 of the computing system 10 of FIG. 1b determining which of the plurality of end users 40* are to be presented with the message 64, the plurality of end users 40* having access to the one or more non-communication applications via one or more communication networks 20 (e.g., LAN, MAN, WLAN, WiMAX, PTSN, PAN, cellular networks, and so forth).

In the same or different implementations, the end user determining operation 402 may include an operation 505 for determining which of the plurality of end users are to be presented with the message, the plurality of end users having access to the one or more non-communication applications via at least the Internet as further depicted in FIG. 5a. For instance, the end user determining module 102 of the computing system 10 of FIG. 1b determining which of the plurality of end users 40* are to be presented with the message 64, the plurality of end users 40* having access to the one or more non-communication applications via at least the Internet.

In some implementations, the end user determining operation 402 of FIG. 4 may include an operation 506 for determining which of the plurality of end users are to be presented with the message, the plurality of end users having access to one or more non-communication productivity applications as further depicted in FIG. 5a. For instance, the end user determining module 102 of the computing system 10 of FIG. 1b determining which of the plurality of end users 40* are to be presented with the message 64, the plurality of end users 40* having access to one or more non-communication productivity applications (e.g., word processing applications, spreadsheet applications, and so forth).

In some cases, operation 506 may, in turn, further include an operation 507 for determining which of the plurality of end users are to be presented with the message, the plurality of end users having access to at least one of a word processing application, a spreadsheet application, a presentation application, a publishing application, a diagramming application, a database management application, a document management application, an accounting application, an engineering or design application, and a project management application as further depicted in FIG. 5a. For instance, the end user determining module 102 of the computing system 10 of FIG. 1b determining which of the plurality of end users 40* are to be presented with the message 64, the plurality of end users 40* having access to at least one of a word processing application, a spreadsheet application, a presentation application, publishing application, a diagramming application, a database management application, a document management application, an accounting application, an engineering or design application (e.g., Photoshop or a computer aided design (CAD) application), and a project management application.

In some implementations, the end user determining operation 402 of FIG. 4 may include an operation 508 for acquiring an end user profile indicating one or more end user characteristics to facilitate in determining which of the plurality of end users are to be presented with the message, the one or more end user characteristics of the end user profile representing one or more characteristics of end users who should be presented with the message as further depicted in FIG. 5a. For instance, the end user profile acquisition module 202 (see FIG. 2a) of the computing system 10 acquiring (e.g., receiving from the Internet or retrieving from a memory 160) an end user profile 66 indicating one or more end user characteristics to facilitate in determining which of the plurality of end users 40* are to be presented with the message 64, the one or more end user characteristics of the end user profile 66 representing one or more characteristics of end users 40* who should be presented with the message 64.

In various implementations, operation 508 may include one or more additional operations. For example, in some implementations, operation 508 may include an operation 509 for receiving the end user profile via at least one communication network as further depicted in FIG. 5a. For instance, the end user profile receiving module 203 (see FIG. 2a) of the computing system 10 receiving the end user profile 66 via at least one communication network 20. In other cases, however, the end user profile 66 may be retrieved from a memory 160.

In some implementations, operation 508 may include an operation 510 for receiving the end user profile from an enterprise associated with the plurality of end users as further depicted in FIG. 5a. For instance, the end user profile receiving module 203 of the computing system 10 receiving the end user profile 66 from an enterprise 30 (e.g., a company, a social organization, a business organization, a school or academic organization, and so forth) associated with the plurality of end users 40*.

In some cases, operation 510 may further include an operation 511 for receiving the end user profile from an organizational unit of the enterprise as further depicted in FIG. 5a. For instance, the end user profile receiving module 203 of the computing system 10 receiving the end user profile 66 from an organizational unit (e.g., the human resource department of the enterprise 30, a product group or division, an accounting department, a cross-functional team, a project team, a special interest group, an enterprise function group, and so forth) of the enterprise 30.

In the same or different implementations, operation 508 may include an operation 512 for receiving the end user profile from an originator of the message as further depicted in FIG. 5a. For instance, the end user profile receiving module 203 of the computing system 10 receiving the end user profile 66 from an originator (e.g., end user 40a in the illustrated example of FIGS. 1a and 1b) of the message 64.

Figure 5B:
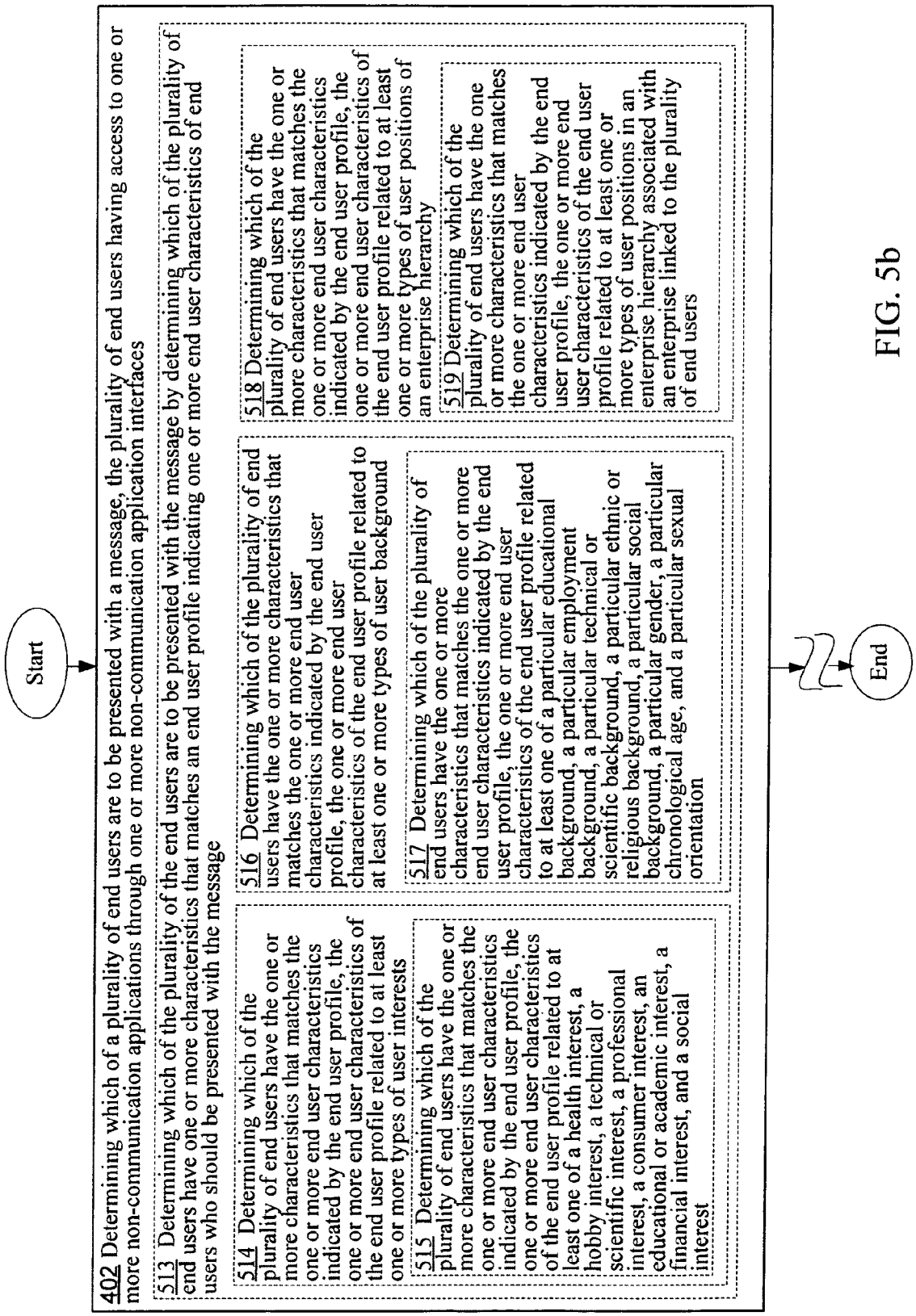
FIG. 5b is a high-level logic flowchart of a process depicting alternate implementations of the end user determining operation 402 of FIG. 4.

In some implementations, the end user determining operation 402 of FIG. 4 may include an operation 513 for determining which of the plurality of the end users are to be presented with the message by determining which of the plurality of end users have one or more characteristics that matches an end user profile indicating one or more end user characteristics of end users who should be presented with the message as depicted in FIG. 5b. For instance, the end user determining module 102 including the end user profile matching determination module 204 (see FIG. 2a) of the computing system 10 determining which of the plurality of the end users 40* are to be presented with the message 64 by determining which of the plurality of end users 40* have one or more characteristics that matches an end user profile 66 indicating one or more end user characteristics of end users 40* who should be presented with the message 64.

In various implementations, operation 513 may further include one or more additional operations. For example, in some implementations, operation 513 may include an operation 514 for determining which of the plurality of end users have the one or more characteristics that matches the one or more end user characteristics indicated by the end user profile, the one or more end user characteristics of the end user profile related to at least one or more types of user interests as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one or more types of user interests (e.g., social or leisure interests, technical interests, employment or work interests, academic interests, and so forth).

In some cases, operation 514 may further include an operation 515 for determining which of the plurality of end users have the one or more characteristics that matches the one or more end user characteristics indicated by the end user profile, the one or more end user characteristics of the end user profile related to at least one of a health interest, a hobby interest, a technical or scientific interest, a professional interest, a consumer interest, an educational or academic interest, a financial interest, and a social interest as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one of a health interest, a hobby interest, a technical or scientific interest, a professional interest, a consumer interest, an educational or academic interest, a financial interest, and a social interest.

In some implementations, operation 513 may include an operation 516 for determining which of the plurality of end users have the one or more characteristics that matches the one or more end user characteristics indicated by the end user profile, the one or more end user characteristics of the end user profile related to at least one or more types of user background as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one or more types of user background.

In some cases, operation 516 may further include an operation 517 for determining which of the plurality of end users have the one or more characteristics that matches the one or more end user characteristics indicated by the end user profile, the one or more end user characteristics of the end user profile related to at least one of a particular educational background, a particular employment background, a particular technical or scientific background, a particular ethnic or religious background, a particular social background, a particular gender, a particular chronological age, and a particular sexual orientation as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one of a particular educational background, a particular employment background, a particular technical or scientific background, a particular ethnic or religious background, a particular social background, a particular gender, a particular chronological age, and a particular sexual orientation.

In some implementations, operation 513 may include an operation 518 for determining which of the plurality of end users have the one or more characteristics that matches the one or more end user characteristics indicated by the end user profile, the one or more end user characteristics of the end user profile related to at least one or more types of user positions of an enterprise hierarchy as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one or more types of user positions of an enterprise hierarchy (e.g., the end user profile 66 indicating a generic enterprise position such as "controller," or, alternatively, a position that may be specific to a particular enterprise 30).

Operation 518 may, in some cases, further include an operation 519 for determining which of the plurality of end users have the one or more characteristics that matches the one or more end user characteristics indicated by the end user profile, the one or more end user characteristics of the end user profile related to at least one or more types of user positions in an enterprise hierarchy associated with an enterprise linked to the plurality of end users as further depicted in FIG. 5b. For instance, the end user profile matching determination module 204 of the computing system 10 determining which of the plurality of end users 40* have the one or more characteristics that matches the one or more end user characteristics indicated by the end user profile 66, the one or more end user characteristics of the end user profile 66 related to at least one or more types of user positions in an enterprise hierarchy associated with an enterprise 30 linked to the plurality of end users 40*.

Figure 5C:
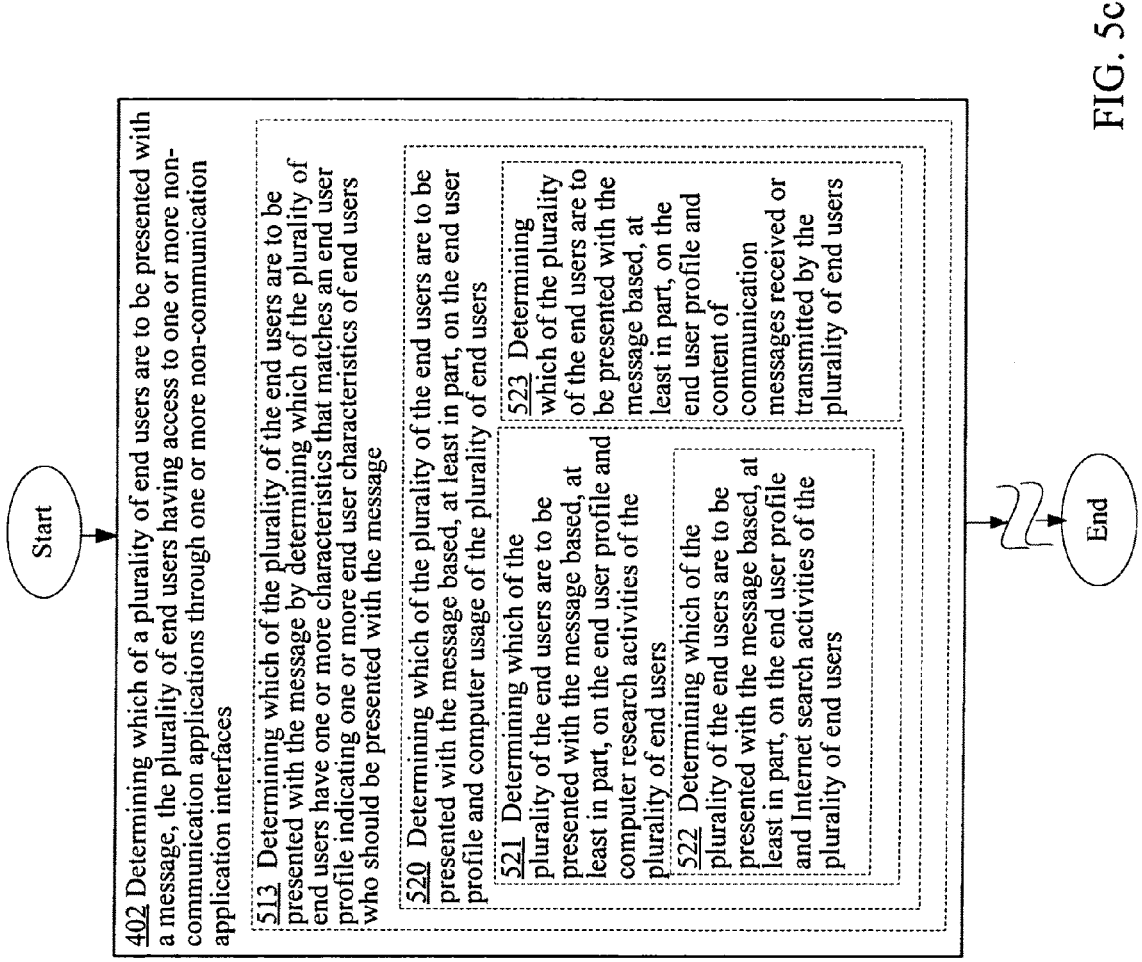
FIG. 5c is a high-level logic flowchart of a process depicting alternate implementations of the end user determining operation 402 of FIG. 4.

In some implementations, operation 513 may include an operation 520 for determining which of the plurality of the end users are to be presented with the message based, at least in part, on the end user profile and computer usage of the plurality of end users as depicted in FIG. 5c. For instance, the "end user profile and computer usage based end user determination" module 206 (see FIG. 2a) of the computing system 10 determining which of the plurality of the end users 40* are to be presented with the message 64 based, at least in part, on the end user profile 66 and computer usage of the plurality of end users 40*.

As will be further described herein, operation 520 may further include one or more additional operations in various alternative implementations. For example, in some implementations, operation 520 may include an operation 521 for determining which of the plurality of the end users are to be presented with the message based, at least in part, on the end user profile and computer research activities of the plurality of end users as depicted in FIG. 5c. For instance, the "end user profile and computer research activity based end user determination" module 208 (see FIG. 2a) of the computing system 10 determining which of the plurality of the end users 40* are to be presented with the message 64 based, at least in part, on the end user profile 66 and computer research activities of the plurality of end users 40*.

Operation 521, in turn, may further include an operation 522 for determining which of the plurality of the end users are to be presented with the message based, at least in part, on the end user profile and Internet search activities of the plurality of end users as depicted in FIG. 5c. For instance, the "end user profile and Internet search activity based end user determination" module 210 (see FIG. 2a) of the computing system 10 determining which of the plurality of the end users 40* are to be presented with the message 64 based, at least in part, on the end user profile 66 and Internet search activities of the plurality of end users 40*.

In some implementations, operation 520 may include an operation 523 for determining which of the plurality of the end users are to be presented with the message based, at least in part, on the end user profile and content of communication messages received or transmitted by the plurality of end users as depicted in FIG. 5c. For instance, the "end user profile and communication message content based end user determination" module 212 (see FIG. 2a) of the computing system 10 determining which of the plurality of the end users 40* are to be presented with the message 64 based, at least in part, on the end user profile 66 and content of communication messages (e.g., emails, IMs, text messages, and so forth) received or transmitted by the plurality of end users 40*. Note that the communication messages described here are not the same as the message 64 to be presented to selective end users (e.g., end user 40e and end user 40g in the example illustrated in FIGS. 1a and 1b).

Figure 5D:
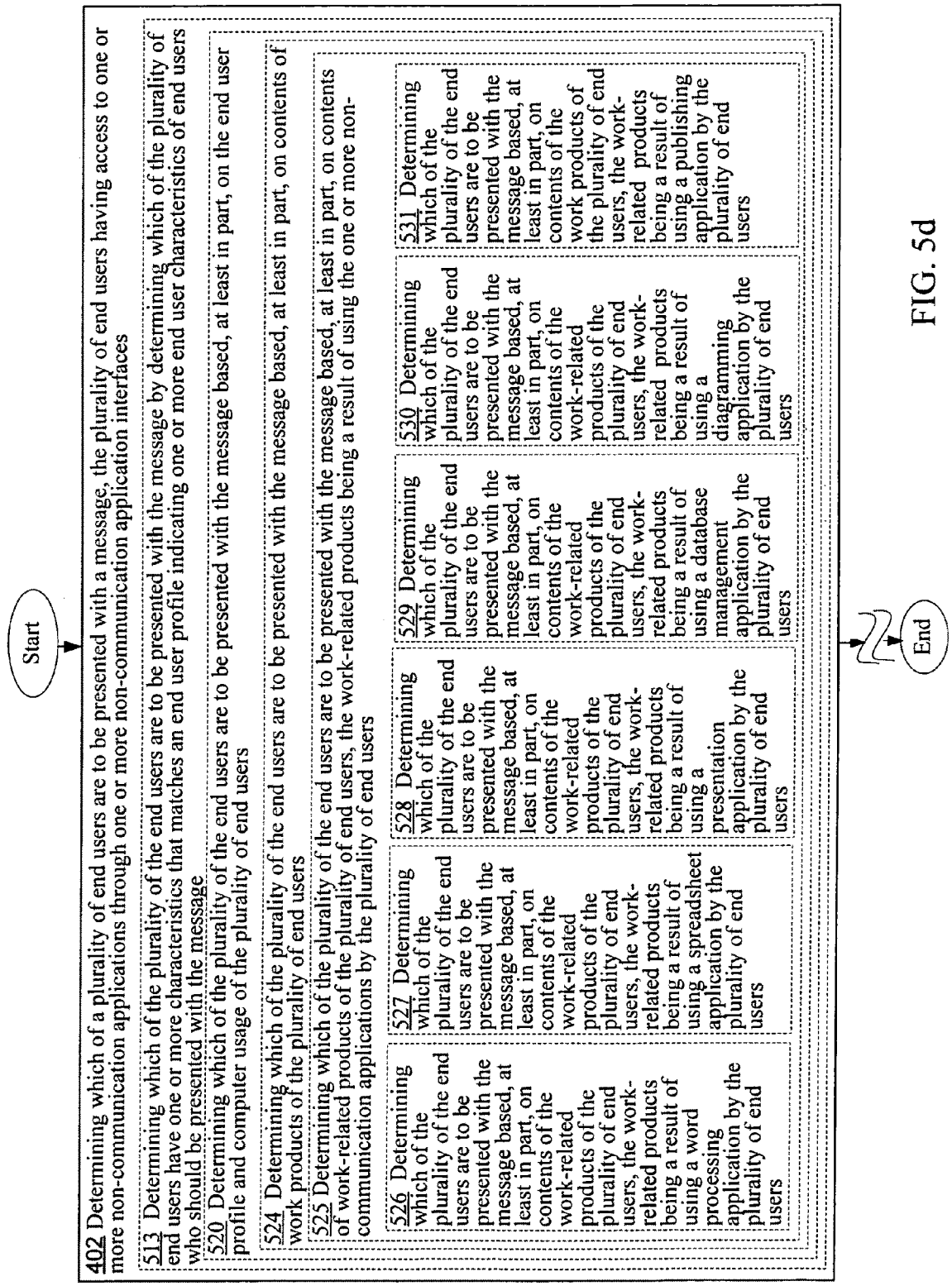
FIG. 5d is a high-level logic flowchart of a process depicting alternate implementations of the end user determining operation 402 of FIG. 4.

In some implementations, operation 520 may include an operation 524 for determining which of the plurality of the end users are to be presented with the message based, at least in part, on contents of work products of the plurality of end users as depicted in FIG. 5d. For instance, the "end user profile and work product based end user determination" module 213 (see FIG. 2a) of the computing system 10 determining which of the plurality of the end users 40* are to be presented with the message 64 based, at least in part, on contents of work products of the plurality of end users 40*.

Operation 524, in turn, may further include an operation 525 for determining which of the plurality of the end users are to be presented with the message based, at least in part, on contents of work-related products of the plurality of end users, the work-related products being a result of using the one or more non-communication applications by the plurality of end users as depicted in FIG. 5d. For instance, the "end user profile and work product based end user determination" module 213 of the computing system 10 determining which of the plurality of the end users 40* are to be presented with the message 64 based, at least in part, on contents of work-related products of the plurality of end users 40*, the work-related products being a result of using the one or more non-communication applications by the plurality of end users 40*.

Various types of work products of the end users 40* may be considered when making a determination as to which end users 40* are to be presented with the message 64. For example, in some implementations, operation 525 may include an operation 526 for determining which of the plurality of the end users are to be presented with the message based, at least in part, on contents of the work-related products of the plurality of end users, the work-related products being a result of using a word processing application by the plurality of end users as depicted in FIG. 5d. For instance, the "end user profile and work product based end user determination" module 213 of the computing system 10 determining which of the plurality of the end users 40* are to be presented with the message 64 based, at least in part, on contents of the work-related products of the plurality of end users 40*, the work-related products being a result of using a word processing application by the plurality of end users 40*.

In the same or different implementations, operation 525 may include an operation 527 for determining which of the plurality of the end users are to be presented with the message based, at least in part, on contents of the work-related products of the plurality of end users, the work-related products being a result of using a spreadsheet application by the plurality of end users as further depicted in FIG. 5d. For instance, the "end user profile and work product based end user determination" module 213 of the computing system 10 determining which of the plurality of the end users 40* are to be presented with the message 64 based, at least in part, on contents of the work-related products of the plurality of end users 40*, the work-related products being a result of using a spreadsheet application by the plurality of end users 40*.

In the same or different implementations, operation 525 may include an operation 528 for determining which of the plurality of the end users are to be presented with the message based, at least in part, on contents of the work-related products of the plurality of end users, the work-related products being a result of using a presentation application by the plurality of end users as further depicted in FIG. 5d. For instance, the "end user profile and work product based end user determination" module 213 of the computing system 10 determining which of the plurality of the end users 40* are to be presented with the message 64 based, at least in part, on contents of the work-related products of the plurality of end users 40*, the work-related products being a result of using a presentation application by the plurality of end users 40*.

In the same or different implementations, operation 525 may include an operation 529 for determining which of the plurality of the end users are to be presented with the message based, at least in part, on contents of the work-related products of the plurality of end users, the work-related products being a result of using a database management application by the plurality of end users as further depicted in FIG. 5d. For instance, the "end user profile and work product based end user determination" module 213 of the computing system 10 determining which of the plurality of the end users 40* are to be presented with the message 64 based, at least in part, on contents of the work-related products of the plurality of end users 40*, the work-related products being a result of using a database management application by the plurality of end users 40*.

In the same or different implementations, operation 525 may include an operation 530 for determining which of the plurality of the end users are to be presented with the message based, at least in part, on contents of the work-related products of the plurality of end users, the work-related products being a result of using a diagramming application by the plurality of end users as further depicted in FIG. 5d. For instance, the "end user profile and work product based end user determination" module 213 of the computing system 10 determining which of the plurality of the end users 40* are to be presented with the message 64 based, at least in part, on contents of the work-related products of the plurality of end users 40*, the work-related products being a result of using a diagramming application by the plurality of end users 40*.

In the same or different implementations, operation 525 may include an operation 531 for determining which of the plurality of the end users are to be presented with the message based, at least in part, on contents of the work products of the plurality of end users, the work-related products being a result of using a publishing application by the plurality of end users as further depicted in FIG. 5d. For instance, the "end user profile and work product based end user" determination module 213 of the computing system 10 determining which of the plurality of the end users 40* are to be presented with the message 64 based, at least in part, on contents of the work-related products of the plurality of end users 40*, the work-related products being a result of using a publishing application by the plurality of end users 40*.

Figure 5E:
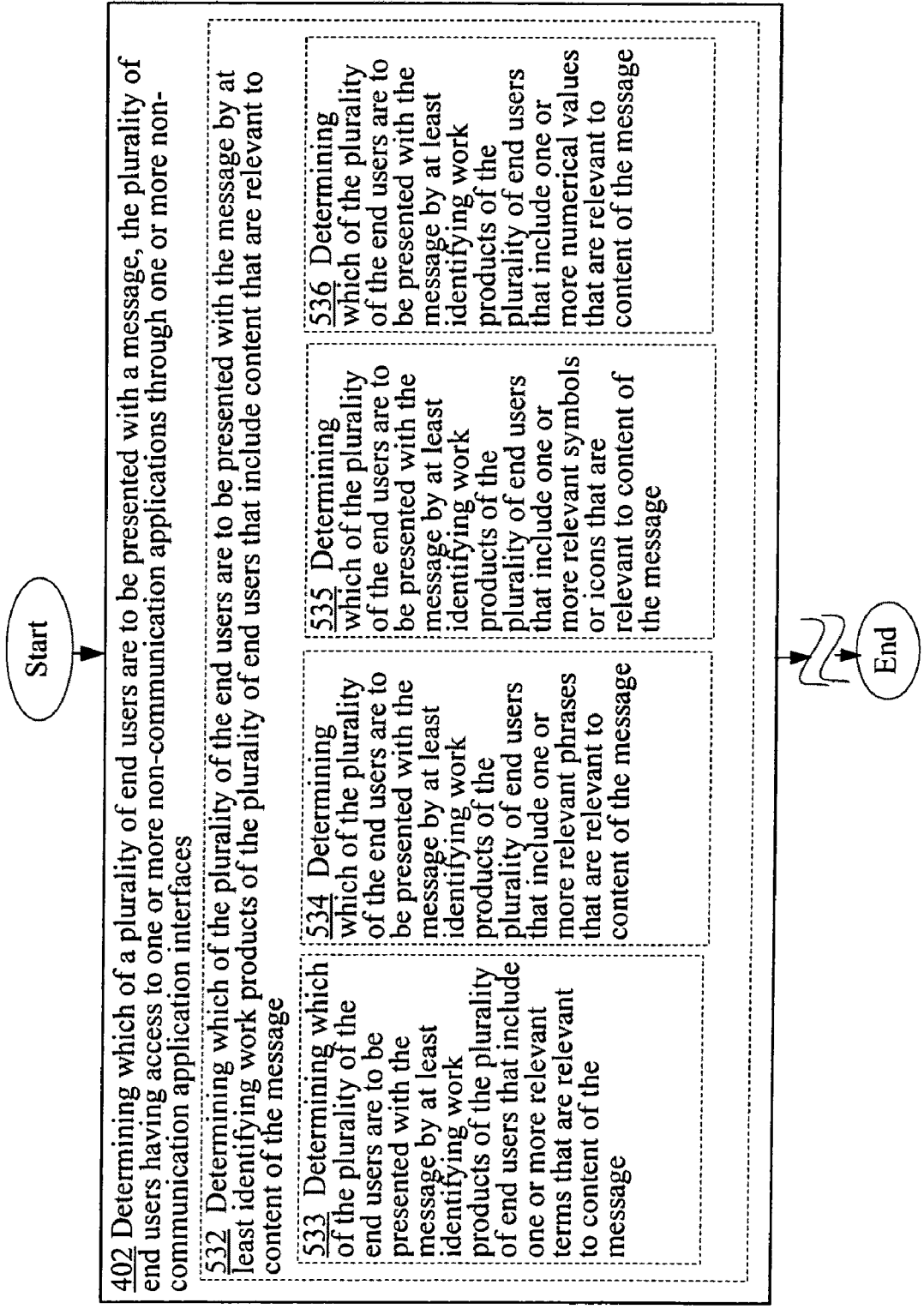
FIG. 5e is a high-level logic flowchart of a process depicting alternate implementations of the end user determining operation 402 of FIG. 4.

In some implementations, the end user determining operation 402 of FIG. 4 may include an operation 532 for determining which of the plurality of the end users are to be presented with the message by at least identifying work products of the plurality of end users that include content that are relevant to content of the message as depicted in FIG. 5e. For instance, the "message content and work product based end user" determination module 214 (see FIG. 2a) of the computing system 10 determining which of the plurality of the end users 40* are to be presented with the message 64 by at least identifying work products of the plurality of end users 40* that include content that are relevant to content of the message 64. In other words, to determine which of the plurality of end users 40* are to be presented with the message 64 by determining whether the content of any of the work products generated by the plurality of end users 40* are related to or relevant to the message 64 to be presented.

Various aspects of the work products may be considered in determining whether contents of work products are relevant with respect to the content of the message 64 to be presented. In some implementations, for example, operation 532 may include an operation 533 for determining which of the plurality of the end users are to be presented with the message by at least identifying work products of the plurality of end users that include one or more relevant terms that are relevant to content of the message as further depicted in FIG. 5e. For instance, the "message content and work product based end user" determination module 214 of the computing system 10 determining which of the plurality of the end users 40* are to be presented with the message 64 by at least identifying work products of the plurality of end users 40* that include one or more relevant terms (e.g., words, names, dates, and so forth) that are relevant to content of the message 64.

In the same or different implementations, operation 532 may include an operation 534 for determining which of the plurality of the end users are to be presented with the message by at least identifying work products of the plurality of end users that include one or more relevant phrases that are relevant to content of the message as further depicted in FIG. 5e. For instance, the "message content and work product based end user" determination module 214 of the computing system 10 determining which of the plurality of the end users 40* are to be presented with the message by at least identifying work products of the plurality of end users 40* that include one or more relevant phrases that are relevant to content of the message 64. For example, if the message 64 is an advertisement from a third party or a message from the enterprise 30 that relate to antacid, then the work products of the plurality of end users 40* that contain the phrase "upset stomach" or "I feel bloated" may be identified as containing relevant phrases. By making such identifications, a determination may be made as to which of the plurality of end users 40* should be presented with the message 64.

In the same or different implementations, operation 532 may include an operation 535 for determining which of the plurality of the end users are to be presented with the message by at least identifying work products of the plurality of end users that include one or more relevant symbols or icons that are relevant to content of the message as further depicted in FIG. 5e. For instance, the "message content and work product based end user" determination module 214 of the computing system 10 determining which of the plurality of the end users 40* are to be presented with the message 64 by at least identifying work products of the plurality of end users 40* that include one or more relevant symbols or icons that are relevant to content of the message 64.

In the same or different implementations, operation 532 may include an operation 536 for determining which of the plurality of the end users are to be presented with the message by at least identifying work products of the plurality of end users that include one or more numerical values that are relevant to content of the message as further depicted in FIG. 5e. For instance, the "message content and work product based end user" determination module 214 of the computing system 10 determining which of the plurality of the end users 40* are to be presented with the message 64 by at least identifying work products of the plurality of end users 40* that include one or more numerical values that are relevant to content of the message 64. For example, identifying work products of the plurality of end users 40* that include a particular emoticon that may be relevant to the content of the message 64.

Figure 5F:
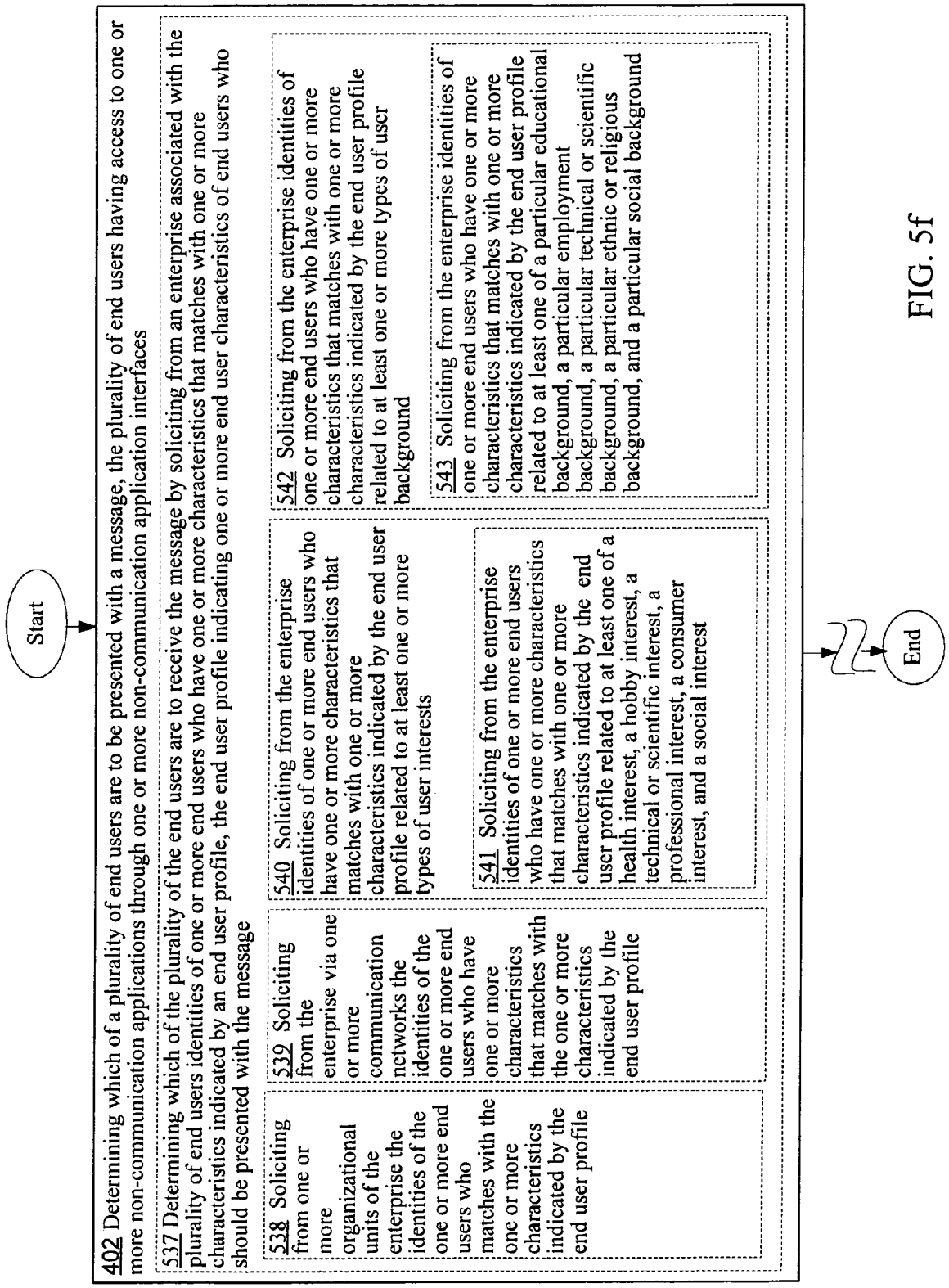
FIG. 5f is a high-level logic flowchart of a process depicting alternate implementations of the end user determining operation 402 of FIG. 4.

In some cases, the end user determining operation 402 of FIG. 4 may involve soliciting for identities of end users 40* who have characteristics that match the characteristics indicated by an end user profile 66. For example, in some implementations, the end user determining operation 402 of FIG. 4 may include an operation 537 for determining which of the plurality of the end users are to receive the message by soliciting from an enterprise associated with the plurality of end users identities of one or more end users who have one or more characteristics that matches with one or more characteristics indicated by an end user profile, the end user profile indicating one or more end user characteristics of end users who should be presented with the message as depicted in FIG. 5f. For instance, the end user determining module 102 including the end user identity solicitation module 216 (see FIG. 2a) of the computing system 10 determining which of the plurality of the end users 40* are to receive the message 64 by soliciting (e.g., querying or requesting) from an enterprise 30 associated with the plurality of end users 40* identities of one or more end users 40* who have one or more characteristics that matches with one or more characteristics indicated by an end user profile 66, the end user profile 66 indicating one or more end user characteristics of end users 40* who should be presented with the message 64. Note that in alternative implementations, the end user determining module 102 including the end user identity solicitation module 216 may be designed to determine which of the plurality of the end users 40* are to receive the message 64 by soliciting (e.g., querying or requesting) from an enterprise 30 associated with the plurality of end users 40* identities of one or more end users 40* who have characteristics that do not match with one or more characteristics indicated by the end user profile 66.

Operation 537 for determining which of the plurality of the end users 40* are to be presented with the message 64 by soliciting for the identities of those end users 40* who should be presented with the message 64 may be accomplished in a number of different ways in various alternative implementations. For example, in some implementations, operation 537 may include an operation 538 for soliciting from one or more organizational units of the enterprise the identities of the one or more end users who matches with the one or more characteristics indicated by the end user profile as depicted in FIG. 5f. For instance, the end user identity solicitation module 216 of the computing system 10 soliciting from one or more organizational units (e.g., a division or a department such as a human resource department and/or an employee) of the enterprise the identities of the one or more end users 40* who matches with the one or more characteristics indicated by the end user profile 66.

In the same or different implementations, operation 537 may include an operation 539 for soliciting from the enterprise via one or more communication networks the identities of the one or more end users who have one or more characteristics that matches with the one or more characteristics indicated by the end user profile as further depicted in FIG. 5f. For instance, the end user identity solicitation module 216 of the computing system 10 soliciting from the enterprise 30 via one or more communication networks 20 the identities of the one or more end users 40* who have one or more characteristics that matches with the one or more characteristics (e.g., a particular enterprise position and/or a particular technical expertise) indicated by the end user profile 66.

In the same or different implementations, operation 537 may include an operation 540 for soliciting from the enterprise identities of one or more end users who have one or more characteristics that matches with one or more characteristics indicated by the end user profile related to at least one or more types of user interests as further depicted in FIG. 5f. For instance, the end user identity solicitation module 216 of the computing system 10 soliciting from the enterprise 30 identities of one or more end users 40* who have one or more characteristics that matches with one or more characteristics indicated by the end user profile 66 related to at least one or more types of user interests.

In some cases, operation 540 may further include an operation 541 for soliciting from the enterprise identities of one or more end users who have one or more characteristics that matches with one or more characteristics indicated by the end user profile related to at least one of a health interest, a hobby interest, a technical or scientific interest, a professional interest, a consumer interest, and a social interest as further depicted in FIG. 5f. For instance, the end user identity solicitation module 216 of the computing system 10 soliciting from the enterprise 30 identities of one or more end users 40* who have one or more characteristics that matches with one or more characteristics indicated by the end user profile 66 related to at least one of a health interest, a hobby interest, a technical or scientific interest, a professional interest, a consumer interest, and a social interest.

In the same or different implementations, operation 537 may include an operation 542 for soliciting from the enterprise identities of one or more end users who have one or more characteristics that matches with one or more characteristics indicated by the end user profile related to at least one or more types of user background as further depicted in FIG. 5f. For instance, the end user identity solicitation module 216 of the computing system 10 soliciting from the enterprise 30 identities of one or more end users 40* who have one or more characteristics that matches with one or more characteristics indicated by the end user profile 66 related to at least one or more types of user background (e.g., user experience).

In some cases, operation 542 may further include an operation 543 for soliciting from the enterprise identities of one or more end users who have one or more characteristics that matches with one or more characteristics indicated by the end user profile related to at least one of a particular educational background, a particular employment background, a particular technical or scientific background, a particular ethnic or religious background, and a particular social background as further depicted in FIG. 5f. For instance, the end user identity solicitation module 216 of the computing system 10 soliciting from the enterprise 30 identities of one or more end users 40* who have one or more characteristics that matches with one or more characteristics indicated by the end user profile 66 related to at least one of a particular educational background, a particular employment background, a particular technical or scientific background, a particular ethnic or religious background, and a particular social background.

Figure 5G:
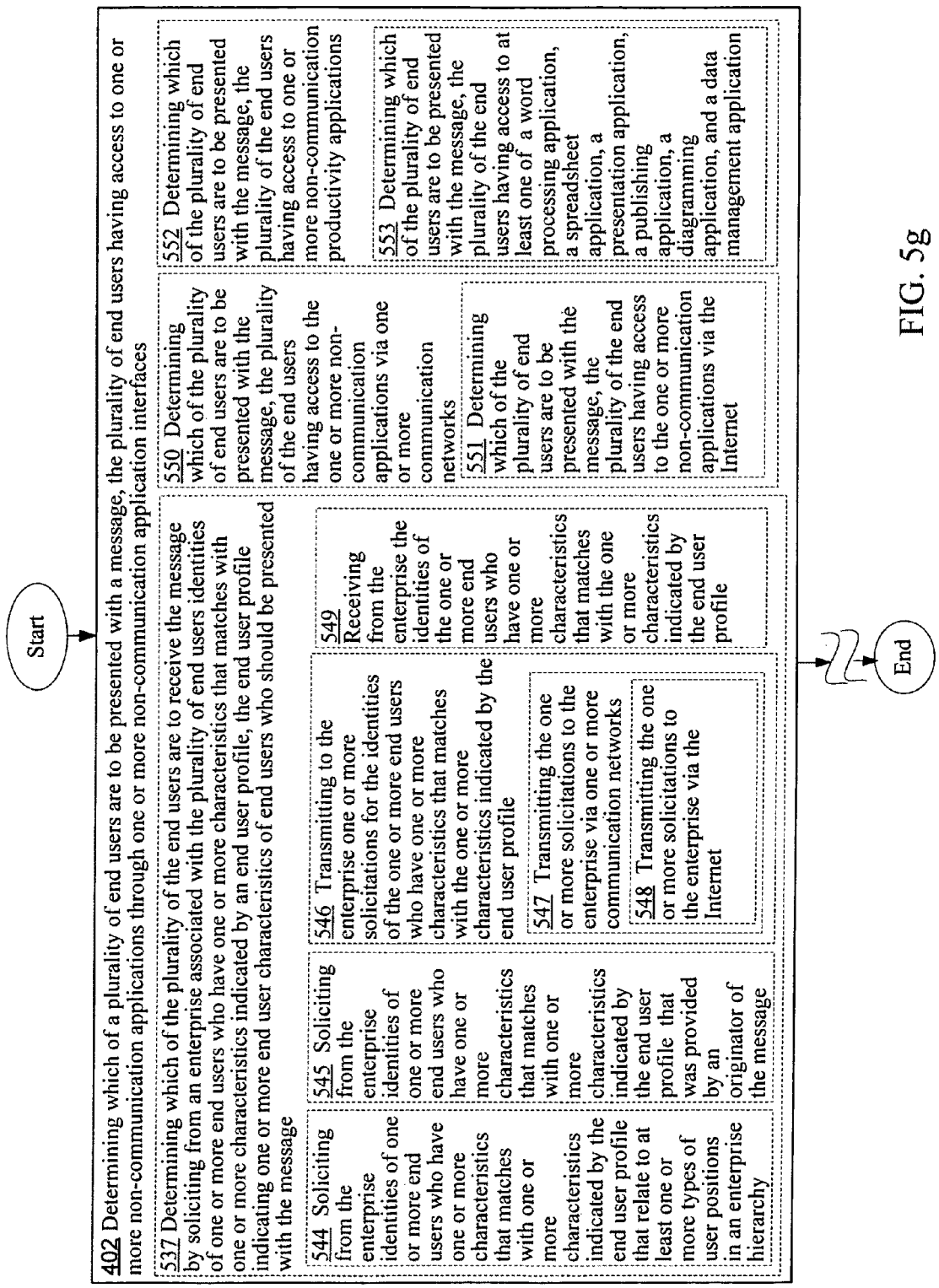
FIG. 5g is a high-level logic flowchart of a process depicting alternate implementations of the end user determining operation 402 of FIG. 4.

In the same or different implementations, operation 537 may include an operation 544 for soliciting from the enterprise identities of one or more end users who have one or more characteristics that matches with one or more characteristics indicated by the end user profile that relate to at least one or more types of user positions in an enterprise hierarchy as depicted in FIG. 5g. For instance, the end user identity solicitation module 216 of the computing system 10 soliciting from the enterprise 30 identities of one or more end users 40* who have one or more characteristics that matches with one or more characteristics indicated by the end user profile 66 that relate to at least one or more types of user positions in an enterprise hierarchy.

In the same or different implementations, operation 537 may include an operation 545 for soliciting from the enterprise identities of one or more end users who have one or more characteristics that matches with one or more characteristics indicated by the end user profile that was provided by an originator of the message as further depicted in FIG. 5g. For instance, the end user identity solicitation module 216 of the computing system 10 soliciting from the enterprise 30 identities of one or more end users 40* who have one or more characteristics that matches with one or more characteristics indicated by the end user profile 66 that was provided by an originator of the message 64 (e.g., in the illustrated example of FIGS. 1a and 1b, the originator of the message 64 may be end user 40a).

In the same or different implementations, operation 537 may include an operation 546 for transmitting to the enterprise one or more solicitations for the identities of the one or more end users who have one or more characteristics that matches with the one or more characteristics indicated by the end user profile as further depicted in FIG. 5g. For instance, the solicitation transmission module 218 (see FIG. 2a) of the computing system 10 transmitting to the enterprise 30 one or more solicitations 70 for the identities of the one or more end users 40* who have one or more characteristics that matches with the one or more characteristics indicated by the end user profile 66.

In various implementations, operation 546 may further include one or more additional operations including an operation 547 for transmitting the one or more solicitations to the enterprise via one or more communication networks as further depicted in FIG. 5g. For instance, the solicitation transmission module 218 of the computing system 10 transmitting the one or more solicitations 70 to the enterprise 30 via one or more communication networks 20 (e.g., LAN, WAN, WLAN, MAN, PAN, Client/Server Network, virtual private network, and so forth).

In some cases, operation 547 may further include an operation 548 for transmitting the one or more solicitations to the enterprise via the Internet as further depicted in FIG. 5g. For instance, the solicitation transmission module 218 of the computing system 10 transmitting the one or more solicitations 70 to the enterprise 30 via the Internet.

In some implementations, operation 537 may include an operation 549 for receiving from the enterprise the identities of the one or more end users who have one or more characteristics that matches with the one or more characteristics indicated by the end user profile as further depicted in FIG. 5g. For instance, the reception module 220 (see FIG. 2a) of the computing system 10 receiving from the enterprise 30 the identities of the one or more end users 40* who have one or more characteristics that matches with the one or more characteristics indicated by the end user profile 66.

In some implementations, the end user determining operation 402 of FIG. 4 may include an operation 550 for determining which of the plurality of end users are to be presented with the message, the plurality of the end users having access to the one or more non-communication applications via one or more communication networks as further depicted in FIG. 5g. For instance, the end user determining module 102 of the computing system 10 determining which of the plurality of end users 40\* are to be presented with the message 64, the plurality of the end users 40\* having access to the one or more non-communication applications (e.g., web-based applications) via one or more communication networks 20.

Operation 550 may, in turn, further include an operation 551 for determining which of the plurality of end users are to be presented with the message, the plurality of the end users having access to the one or more non-communication applications via the Internet as further depicted in FIG. 5g. For instance, the end user determining module 102 of the computing system 10 determining which of the plurality of end users 40\* are to be presented with the message 64, the plurality of the end users 40\* having access to the one or more non-communication applications via the Internet.

In some implementations, the end user determining operation 402 of FIG. 4 may include an operation 552 for determining which of the plurality of end users are to be presented with the message, the plurality of the end users having access to one or more non-communication productivity applications as further depicted in FIG. 5g. For instance, the end user determining module 102 of the computing system 10 determining which of the plurality of end users 40\* are to be presented with the message 64, the plurality of the end users 40\* having access to one or more non-communication productivity applications (e.g., word processing application, spreadsheet application, and so forth).

In some cases, operation 552 may further include an operation 553 of determining which of the plurality of end users are to be presented with the message, the plurality of the end users having access to at least one of a word processing application, a spreadsheet application, a presentation application, a publishing application, a diagramming application, and a data management application as further depicted in FIG. 5g. For instance, the end user determining module 102 of the computing system 10 determining which of the plurality of end users 40\* are to be presented with the message 64, the plurality of the end users 40\* having access to at least one of a word processing application, a spreadsheet application, a presentation application, a publishing application, a diagramming application, and a data management application.

Figure 6A:
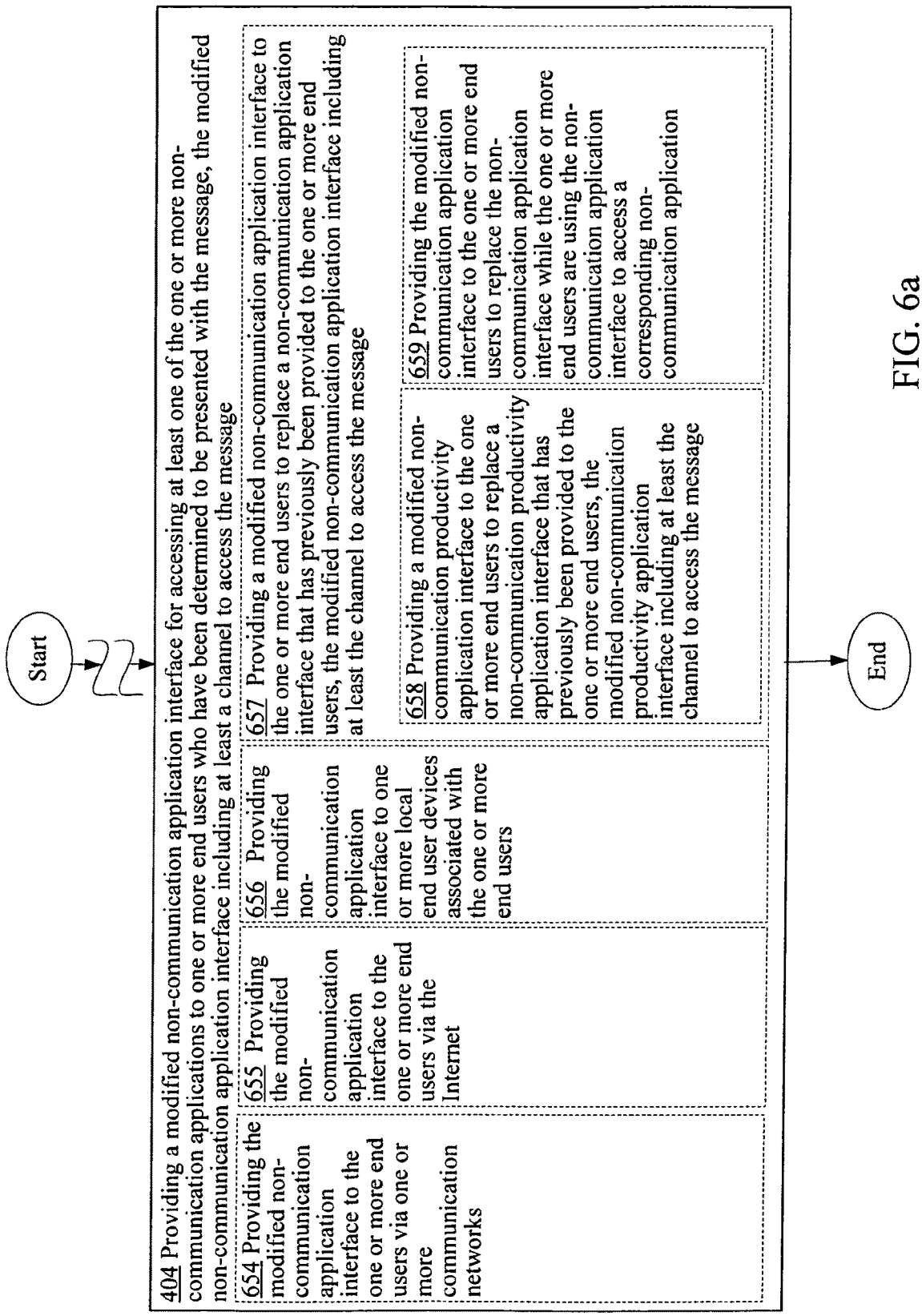
FIG. 6a is a high-level logic flowchart of a process depicting alternate implementations of the modified non-communication application interface providing operation 404 of FIG. 4.

Referring back to the modified non-communication application interface providing operation 404 of FIG. 4, in various implementations, the modified non-communication application interface providing operation 404 may include one or more additional operations. For example, in some implementations, the modified non-communication application interface providing operation 404 may include an operation 654 for providing the modified non-communication application interface to the one or more end users via one or more communication networks as depicted in FIG. 6a. For instance, the "modified non-communication application interface" providing module 106 of the computing system 10 providing the modified non-communication application interface 68 to the one or more end users 40\* (e.g., through one or more end user devices 50\*) via one or more communication networks 20.

In some implementations, the modified non-communication application interface providing operation 404 may include an operation 655 for providing the modified non-communication application interface to the one or more end users via the Internet as depicted in FIG. 6a. For instance, the "modified non-communication application interface" providing module 106 of the computing system 10 providing the modified non-communication application interface 68 to the one or more end users 40\* (e.g., through one or more end user devices 50\*) via the Internet.

In some implementations, the modified non-communication application interface providing operation 404 may include an operation 656 for providing the modified non-communication application interface to one or more local end user devices associated with the one or more end users as further depicted in FIG. 6a. For instance, the "modified non-communication application interface" providing module 106 of the computing system 10 providing the modified non-communication application interface 68 to one or more local end user devices 50\* associated with the one or more end users 40\*.

In some implementations, the modified non-communication application interface providing operation 404 may include an operation 657 for providing a modified non-communication application interface to the one or more end users to replace a non-communication application interface that has previously been provided to the one or more end users, the modified non-communication application interface including at least the channel to access the message as further depicted in FIG. 6a. For instance, the "modified non-communication application interface" providing module 106 of the computing system 10 providing a modified non-communication application interface 68 to the one or more end users 40\* to replace a non-communication application interface 62 that has previously been provided to the one or more end users 40\*, the modified non-communication application interface 68 including at least the channel to access the message 64.

In various implementations, operation 657 may include one or more additional operations. For example, in some implementations, operation 657 may include an operation 658 for providing a modified non-communication productivity application interface to the one or more end users to replace a non-communication productivity application interface that has previously been provided to the one or more end users, the modified non-communication productivity application interface including at least the channel to access the message as further depicted in FIG. 6a. For instance, the "modified non-communication productivity application interface" providing module 230 of the computing system 10 providing a modified non-communication productivity application interface (e.g., modified non-communication application interface 68) to the one or more end users 40\* to replace a non-communication productivity application interface that has previously been provided to the one or more end users 40\*, the modified non-communication productivity application interface including at least the channel to access the message 64.

In the same or different implementations, operation 657 may include an operation 659 for providing the modified non-communication application interface to the one or more end users to replace the non-communication application interface while the one or more end users are using the non-communication application interface to access a corresponding non-communication application as further depicted in FIG. 6a. For instance, the "modified non-communication application interface" providing module 106 of the computing system 10 providing the modified non-communication application interface 68 to the one or more end users 40\* to replace the non-communication application interface 62 while the one or more end users 40\* are using the non-communication application interface 62 to access a corresponding non-communication application (e.g., a word processing application, a spreadsheet application, and so forth).

Figure 6B:
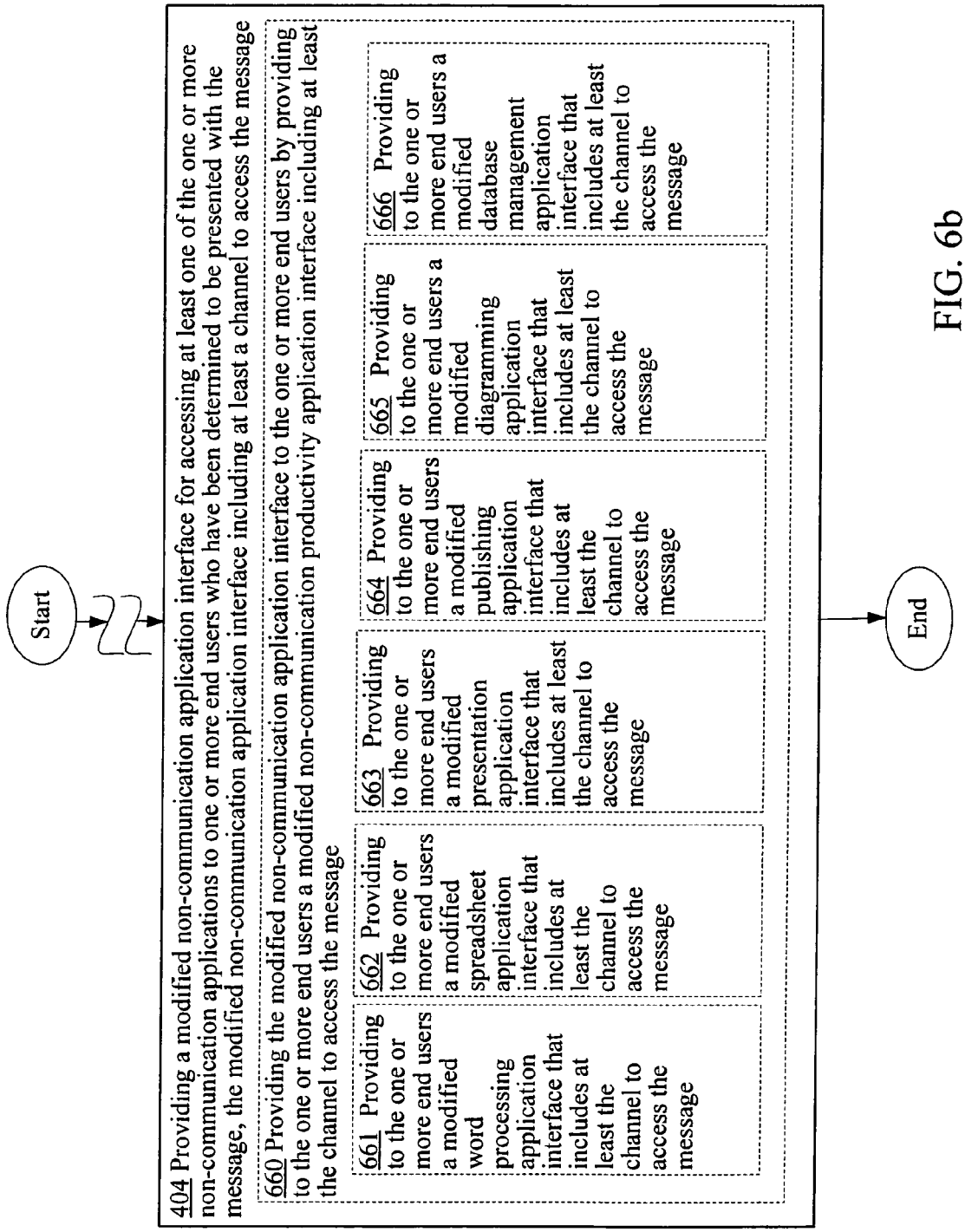
FIG. 6b is a high-level logic flowchart of a process depicting alternate implementations of the modified non-communication application interface providing operation 404 of FIG. 4.

In various implementations, the modified non-communication application interface 68 to be provided through the modified non-communication application interface providing operation 404 of FIG. 4 may be a modified interface for a non-communication productivity application. For example, in some implementations, the modified non-communication application interface providing operation 404 may include an operation 660 for providing the modified non-communication application interface to the one or more end users by providing to the one or more end users a modified non-communication productivity application interface including at least the channel to access the message as depicted in FIG. 6*b*. For instance, and as an illustration, the "modified non-communication productivity application interface" providing module 230 (see FIG. 2*b*) of the computing system 10 providing the modified non-communication application interface 68 to the one or more end users 40* by providing to the one or more end users 40* a modified non-communication productivity application interface (e.g., the modified non-communication application interface 68 in FIGS. 1*a* and 1*b*) including at least the channel to access the message 64.

The modified interface of various types of non-communication productivity applications may be provided through operation 660 in various alternative implementations. For example, in some implementations, operation 660 may include an operation 661 for providing to the one or more end users a modified word processing application interface that includes at least the channel to access the message as further depicted in FIG. 6*b*. For instance, the "modified word processing application interface" providing module 232 (see FIG. 2*b*) of the computing system 10 providing to the one or more end users 40* a modified word processing application interface (e.g., the modified non-communication application interface 68) that includes at least the channel to access the message 64.

In the same or different implementations, operation 660 may include an operation 662 for providing to the one or more end users a modified spreadsheet application interface that includes at least the channel to access the message as further depicted in FIG. 6*b*. For instance, the "modified spreadsheet application interface" providing module 234 (see FIG. 2*b*) of the computing system 10 providing to the one or more end users 40* a modified spreadsheet application interface (e.g., the modified non-communication application interface 68) that includes at least the channel to access the message 64.

In the same or different implementations, operation 660 may include an operation 663 for providing to the one or more end users a modified presentation application interface that includes at least the channel to access the message as further depicted in FIG. 6*b*. For instance, the "modified presentation application interface" providing module 236 (see FIG. 2*b*) of the computing system 10 providing to the one or more end users 40* a modified presentation application interface (e.g., the modified non-communication application interface 68) that includes at least the channel to access the message 64.

In the same or different implementations, operation 660 may include an operation 664 for providing to the one or more end users a modified publishing application interface that includes at least the channel to access the message as further depicted in FIG. 6*b*. For instance, the "modified publishing application interface" providing module 238 (see FIG. 2*b*) of the computing system 10 providing to the one or more end users 40* a modified publishing application interface (e.g., the modified non-communication application interface 68) that includes at least the channel to access the message 64.

In the same or different implementations, operation 660 may include an operation 665 for providing to the one or more end users a modified diagramming application interface that includes at least the channel to access the message as further depicted in FIG. 6*b*. For instance, the "modified diagramming application interface" providing module 240 (see FIG. 2*b*) of the computing system 10 providing to the one or more end users 40* a modified diagramming application interface (e.g., the modified non-communication application interface 68) that includes at least the channel to access the message 64.

In the same or different implementations, operation 660 may include an operation 666 for providing to the one or more end users a modified database management application interface that includes at least the channel to access the message as further depicted in FIG. 6*b*. For instance, the "modified database management application interface" providing module 242 (see FIG. 2*b*) of the computing system 10 providing to the one or more end users 40* a modified database management application interface (e.g., the modified non-communication application interface 68) that includes at least the channel to access the message 64.

Figure 6C:
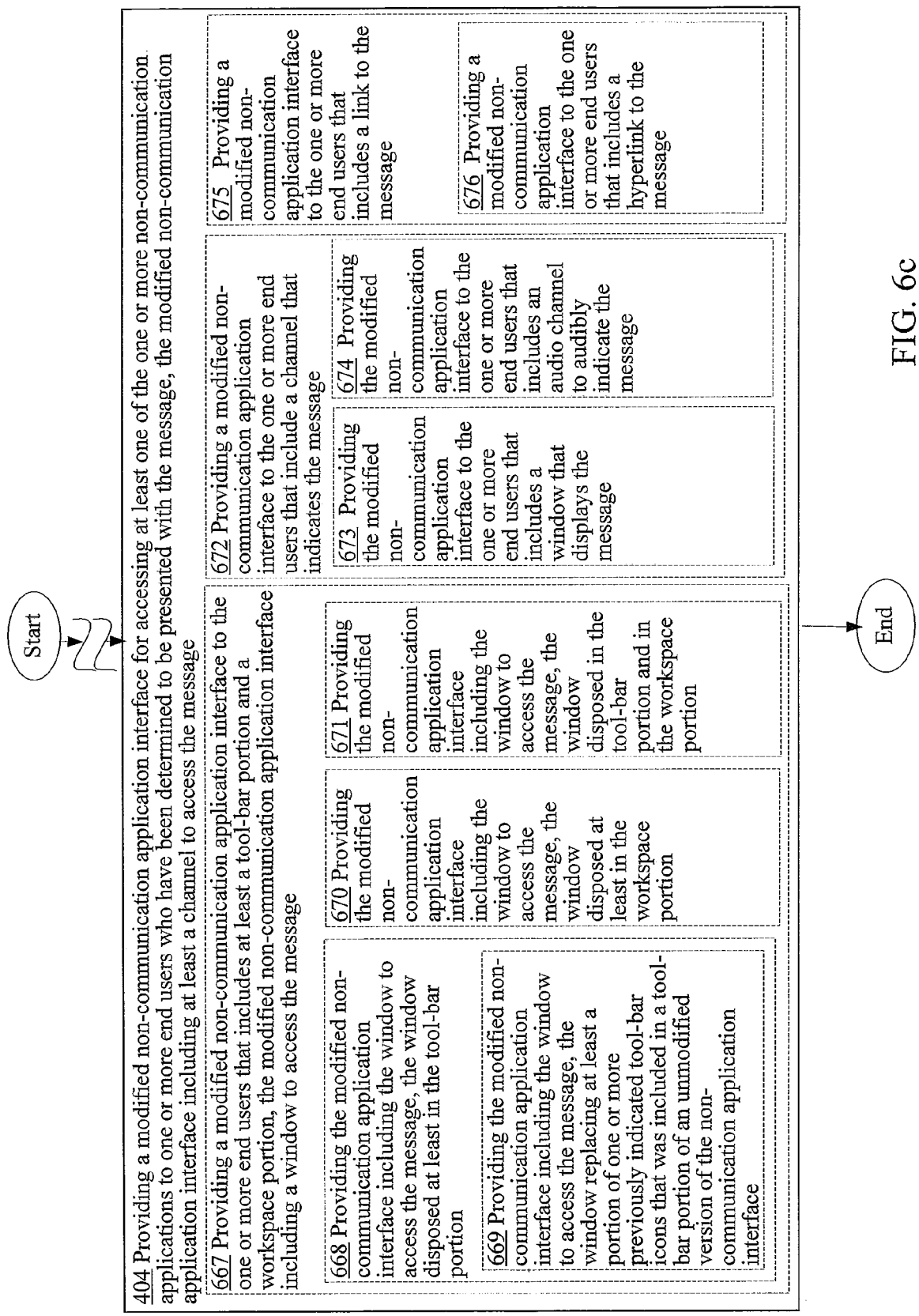
FIG. 6c is a high-level logic flowchart of a process depicting alternate implementations of the modified non-communication application interface providing operation 404 of FIG. 4.

Referring back to the modified non-communication application interface providing operation 404 of FIG. 4, in various implementations the modified interface (e.g., the modified non-communication application interface 68) that may be provided through operation 404 may be an interface that may be displayed through, for example, a display monitor. For example, in some implementations, the modified non-communication application interface providing operation 404 may include an operation 667 for providing a modified non-communication application interface to the one or more end users that includes at least a tool-bar portion and a workspace portion, the modified non-communication application interface including a window to access the message as depicted in FIG. 6*c*. For instance, the "modified non-communication application interface" providing module 106 of the computing system 10 providing a modified non-communication application interface 68 to the one or more end users 40* that includes at least a tool-bar portion 304 and a workspace portion 306, the modified non-communication application interface 68 including a window 308* (see FIGS. 3*b* to 3*e*) to access the message 64. Note that in some alternative implementations, as will be further described below, the modified interface to be provided through the modified non-communication application interface providing operation 404 may be a modified audio interface.

In any event, operation 667 in various implementations may further include an operation 668 for providing the modified non-communication application interface including the window to access the message, the window disposed at least in the tool-bar portion as depicted in FIG. 6*c*. For instance, the "modified non-communication application interface" providing module 106 of the computing system 10 providing the modified non-communication application interface 68 including the window (e.g., window 308*b*, window 308*c*, and/or window 308*d* of FIGS. 3*b*, 3*c*, and/or 3*d*) to access the message 64, the window (e.g., window 308*b*, window 308*c*, and/or window 308*d* of FIGS. 3*b*, 3*c*, and/or 3*d*) disposed at least in the tool-bar portion 304.

Operation 668, in turn, may further include an operation 669 for providing the modified non-communication application interface including the window to access the message, the window replacing at least a portion of one or more previously indicated tool-bar icons that was included in a tool-bar portion of an unmodified version of the non-communication application interface as further depicted in FIG. 6*c*. For instance, the "modified non-communication application interface" providing module 106 of the computing system 10 providing the modified non-communication application interface 68 including the window (e.g., window 308*c* and window 308*d* of FIGS. 3*c* and 3*d*) to access the message 64, the window (e.g., window 308*c* and window 308*d* of FIGS. 3*c* and 3*d*) replacing at least a portion of one or more previously indicated tool-bar icons that was included in a tool-bar portion 304 of an unmodified version of the non-communication application interface 62.

In the same or different implementations, operation 667 may include an operation 670 for providing the modified non-communication application interface including the window to access the message, the window disposed at least in the workspace portion as further depicted in FIG. 6*c*. For instance, the "modified non-communication application interface" providing module 106 of the computing system 10 providing the modified non-communication application interface 68 including the window (e.g., window 308*d* and window 308*e* of FIGS. 3*d* and 3*e*) to access the message 64, the window (e.g., window 308*d* and window 308*e* of FIGS. 3*d* and 3*e*) disposed at least in the workspace portion 306.

In the same or different implementations, operation 667 may include an operation 671 for providing the modified non-communication application interface including the window to access the message, the window disposed in the tool-bar portion and in the workspace portion as further depicted in FIG. 6*c*. For instance, the "modified non-communication application interface" providing module 106 of the computing system 10 providing the modified non-communication application interface 68 including the window (e.g., window 308*d* and window 308*e* of FIGS. 3*d* and 3*e*) to access the message 64, the window (e.g., window 308*d* and window 308*e* of FIGS. 3*d* and 3*e*) disposed at least in the workspace portion 306.

In some implementations, the modified non-communication application interface providing operation 404 of FIG. 4 may include an operation 672 for providing a modified non-communication application interface to the one or more end users that includes a channel that indicates the message as further depicted in FIG. 6*c*. For instance, the "modified non-communication application interface" providing module 106 of the computing system 10 providing a modified non-communication application interface 68 to the one or more end users 40* that includes a channel that indicates (e.g., displays or audibly indicate) the message 64.

Operation 672, in turn, may further include an operation 673 for providing the modified non-communication application interface to the one or more end users that includes a window that displays the message as further depicted in FIG. 6*c*. For instance, the "modified non-communication application interface" providing module 106 of the computing system 10 providing the modified non-communication application interface 68 to the one or more end users 40* that includes a window 308 that displays the message 64**.

In the same or different implementations, operation 672 may include an operation 674 for providing the modified non-communication application interface to the one or more end users that includes an audio channel to audibly indicate the message as further depicted in FIG. 6*c*. For instance, the "modified non-communication application interface" providing module 106 of the computing system 10 providing the modified non-communication application interface 68 to the one or more end users 40* that includes an audio channel to audibly indicate the message 64.

In some implementations, the modified non-communication application interface providing operation 404 of FIG. 4 may include an operation 675 for providing a modified non-communication application interface to the one or more end users that includes a link to the message as further depicted in FIG. 6*c*. For instance, the "modified non-communication application interface" providing module 106 of the computing system 10 providing a modified non-communication application interface 68 to the one or more end users 40* that includes a link (e.g., an URL address) to the message 64.

In some cases, operation 675 may further include an operation 676 for providing a modified non-communication application interface to the one or more end users that includes a hyperlink to the message as further depicted in FIG. 6*c*. For instance, the "modified non-communication application interface" providing module 106 of the computing system 10 providing a modified non-communication application interface 68 to the one or more end users 40* that includes a hyperlink to the message 64.

Figure 6D:
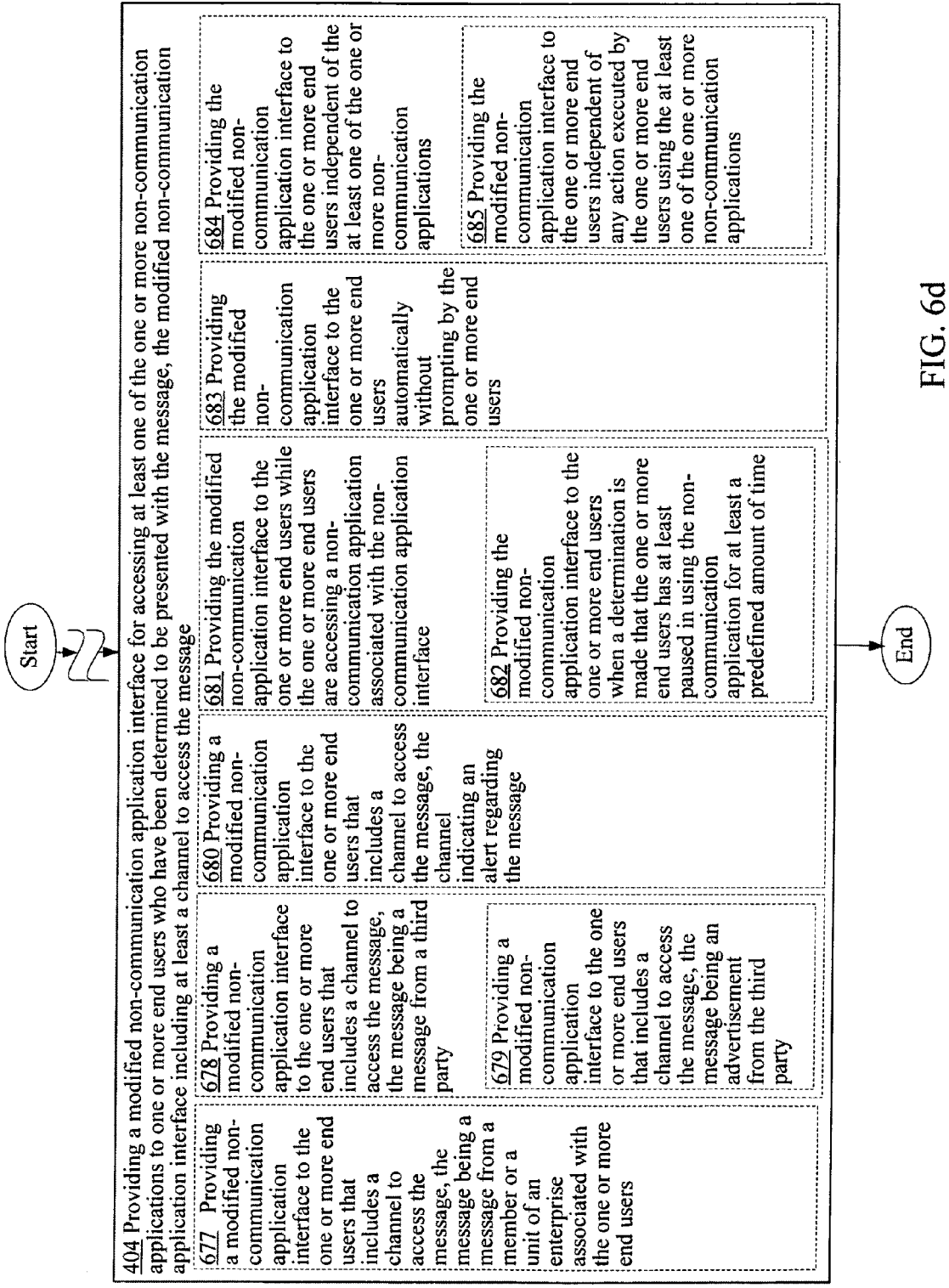
FIG. 6d is a high-level logic flowchart of a process depicting alternate implementations of the modified non-communication application interface providing operation 404 of FIG. 4.

In some implementations, the modified non-communication application interface providing operation 404 of FIG. 4 may include an operation 677 for providing a modified non-communication application interface to the one or more end users that includes a channel to access the message, the message being a message from a member or a unit of an enterprise associated with the one or more end users as depicted in FIG. 6*d*. For instance, the "modified non-communication application interface" providing module 106 of the computing system 10 providing a modified non-communication application interface 68 to the one or more end users 40* that includes a channel to access the message 64, the message 64 being a message 64 from a member or a unit of an enterprise 30 associated with the one or more end users 40*.

In various implementations, the modified non-communication application interface providing operation 404 of FIG. 4 may include an operation 678 for providing a modified non-communication application interface to the one or more end users that includes a channel to access the message, the message being a message from a third party as further depicted in FIG. 6*d*. For instance, the "modified non-communication application interface" providing module 106 of the computing system 10 providing a modified non-communication application interface 68 to the one or more end users 40* that includes a channel to access the message 64, the message 64 being a message 64 from a third party.

In some implementations, operation 678 may further include an operation 679 for providing a modified non-communication application interface to the one or more end users that includes a channel to access the message, the message being an advertisement from the third party as further depicted in FIG. 6*d*. For instance, the "modified non-communication application interface" providing module 106 of the computing system 10 providing a modified non-communication application interface 68 to the one or more end users 40* that includes a channel to access the message 64, the message 64 being an advertisement 65 from the third party.

In some implementations, the modified non-communication application interface providing operation 404 may include an operation 680 for providing a modified non-communication application interface to the one or more end users that includes a channel to access the message, the channel indicating an alert regarding the message as further depicted in FIG. 6*d*. For instance, the "modified non-communication application interface" providing module 106 of the computing system 10 providing a modified non-communication application interface 68 to the one or more end users 40* that includes a channel to access the message 64, the channel indicating an alert regarding the message 64 (e.g., reception of the message 64).

In the same or different implementations, the modified non-communication application interface providing operation 404 may include an operation 681 for providing the modified non-communication application interface to the one or more end users while the one or more end users are accessing a non-communication application associated with the non-communication application interface as further depicted in FIG. 6d. For instance, the "modified non-communication application interface" providing module 106 of the computing system 10 providing the modified non-communication application interface 68 to the one or more end users 40* while the one or more end users 40* are accessing a non-communication application associated with the non-communication application interface 62.

In some cases, operation 681 may further include an operation 682 for providing the modified non-communication application interface to the one or more end users when a determination is made that the one or more end users has at least paused in using the non-communication application for at least a predefined amount of time as further depicted in FIG. 6d. For instance, the "modified non-communication application interface" providing module 106 of the computing system 10 providing the modified non-communication application interface 68 to the one or more end users 40* when a determination is made that the one or more end users 40* has at least paused in using the non-communication application for at least a predefined amount of time (e.g., 20 seconds, 24 seconds, one minutes, five minutes, or other time increments).

In the same or different implementations, the modified non-communication application interface providing operation 404 may include an operation 683 for providing the modified non-communication application interface to the one or more end users automatically without prompting by the one or more end users as further depicted in FIG. 6d. For instance, the "modified non-communication application interface" providing module 106 of the computing system 10 providing the modified non-communication application interface 68 to the one or more end users 40* automatically without prompting by the one or more end users 40* (e.g., providing the modified non-communication application interface without being prompted by an activity of an end user 40*).

In the same or different implementations, the modified non-communication application interface providing operation 404 may include an operation 684 for providing the modified non-communication application interface to the one or more end users independent of the at least one of the one or more non-communication applications as further depicted in FIG. 6d. For instance, the "modified non-communication application interface" providing module 106 of the computing system 10 providing the modified non-communication application interface 68 to the one or more end users 40* independent of the at least one of the one or more non-communication applications (e.g., providing the modified non-communication application interface 68 without any involvement or execution of an operation by the non-communication application associated with the modified non-communication application interface 68).

In some cases, operation 684 may further include an operation 685 for providing the modified non-communication application interface to the one or more end users independent of any action executed by the one or more end users using the at least one of the one or more non-communication applications as further depicted in FIG. 6d. For instance, the "modified non-communication application interface" providing module 106 of the computing system 10 providing the modified non-communication application interface 68 to the one or more end users 40* independent of any action executed by the one or more end users 40* using the at least one of the one or more non-communication applications (e.g., one or more non-communication productivity applications).

Turning now to FIG. 7, which is a high-level block diagram illustrating a particular implementation of the computing system 10 of FIG. 1b. As illustrated, the computing system 10, which in some cases may comprise of one or more network devices such as one or more servers, may include one or more processors 702 (e.g., one or more microprocessors, one or more controllers, and so forth) linked to storage medium 706 (e.g., volatile and/or non-volatile memory). The storage medium 706 may store computer readable instructions 704 (e.g., computer program product). The processor 702, in various implementations, may execute the computer readable instructions 704 in order to execute one or more operations described above and as illustrated in FIGS. 4, 5a, 5b, 5c, 5d, 5e, 5f, 5g, 6a, 6b, 6c, and 6d.

For example, the processor 702 may execute the computer readable instructions 704 in order to determine which of a plurality of end users 40* are to be presented with a message 64, the plurality of end users 40* having access to one or more non-communication applications through one or more non-communication application interfaces 62; and/or to provide a modified non-communication application interface 68 to one or more end users 40* who have been determined to receive the message 64, the modified non-communication application interface 68 including at least a window to access the message 64 as illustrated by the operational flow 400 of FIG. 4.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system, comprising:
an end user determination module configured to determine which of a plurality of end users having access to one or more non-communication applications through one or more non-communication application interfaces are to be presented with a message, wherein said end user determination module configured to determine which of a plurality of end users having access to one or more non-communication applications through one or more non-communication application interfaces are to be presented with a message comprises:
an end user profile matching determination module configured to determine which of the plurality of end users have one or more characteristics that matches an end user profile indicating one or more end user characteristics of end users who should be presented with the message, wherein said end user profile matching determination module comprises:
an end user profile and computer usage based end user determination module configured to determine, based at least in part on the end user profile and computer usage of the plurality of end users, which of the plurality of the end users are to be presented with the message, wherein said end user profile and computer usage based end user determination module comprises:
an end user profile and computer research activity based end user determination module configured to determine, based at least in part on the end user profile and computer research activities of the plurality of end users, which of the plurality of the end users are to be presented with the message, wherein said end user profile and computer research activity based end user determination module comprises:
an end user profile and Internet search activity based end user determination module configured to determine, based at least in part on the end user profile and Internet search activities of the plurality of end users, which of the plurality of the end users are to be presented with the message;
a modified non-communication application interface providing module configured to provide to one or more end users who have been determined to be presented with the message a modified non-communication application interface that include at least a channel to access the message, the modified non-communication application interface for accessing at least one of the one or more non-communication applications; and
one or more processors.

2. The system of claim 1, wherein said end user determination module configured to determine which of a plurality of end users having access to one or more non-communication applications through one or more non-communication application interfaces are to be presented with a message comprises:
an end user determining module configured to determine which of a plurality of end users having access to the one or more non-communication applications via at least the Internet are to be presented with the message.

3. The system of claim 1, wherein said end user determination module configured to determine which of a plurality of end users having access to one or more non-communication applications through one or more non-communication application interfaces are to be presented with a message comprises:
an end user profile acquiring module configured to acquire an end user profile indicating one or more end user characteristics that represents one or more characteristics of end users who should be presented with the message to facilitate in determining which of the plurality of end users are to be presented with the message.

4. The system of claim 3, wherein said end user profile acquiring module comprises:
an end user profile receiving module configured to receive, from an enterprise associated with the plurality of end users, the end user profile.

5. The system of claim 4, wherein said end user profile receiving module comprises:
an end user profile receiving module configured to receive, from an organizational unit of the enterprise, the end user profile.

6. The system of claim 3, wherein said end user profile acquiring module comprises:
an end user profile receiving module configured to receive, from an originator of the message, the end user profile.

7. The system of claim 1, wherein said end user profile matching determination module comprises:
an end user profile matching determination module configured to determine which of the plurality of end users have one or more characteristics that matches one or more end user characteristics related to at least one or more types of user interests indicated by the end user profile.

8. The system of claim 1, wherein said end user profile matching determination module comprises:
an end user profile matching determination module configured to determine which of the plurality of end users have one or more characteristics that matches one or more end user characteristics related to at least one or more types of user background indicated by the end user profile.

9. The system of claim 1, wherein said end user profile matching determination module comprises:

an end user profile matching determination module configured to determine which of the plurality of end users have one or more characteristics that matches one or more end user characteristics related to at least one or more types of user positions of an enterprise hierarchy indicated by the end user profile.

10. The system of claim 1, wherein said end user profile and computer usage based end user determination module comprises:
an end user profile and communication message content based end user determination module configured to determine, based at least in part on the end user profile and content of communication messages received or transmitted by the plurality of end users, which of the plurality of the end users are to be presented with the message.

11. The system of claim 1, wherein said end user profile and computer usage based end user determination module comprises:
an end user profile and work product based end user determination module configured to determine, based at least in part, on contents of work products of the plurality of end users, which of the plurality of the end users are to be presented with the message.

12. The system of claim 11, wherein said end user profile and work product based end user determination module comprises:
an end user profile and work product based end user determination module configured to determine, based at least in part, on contents of work-related products of the plurality of end users that were as a result of using the one or more non-communication applications by the plurality of end users, which of the plurality of the end users are to be presented with the message.

13. The system of claim 1, wherein said end user determination module configured to determine which of a plurality of end users having access to one or more non-communication applications through one or more non-communication application interfaces are to be presented with a message comprises:
an end user identity solicitation module configured to solicit from an enterprise associated with the plurality of end users identities of one or more end users who have one or more characteristics that matches with one or more characteristics indicated by an end user profile, the end user profile indicating one or more end user characteristics of end users who should be presented with the message.

14. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide, via one or more communication networks, the modified non-communication application interface to the one or more end users.

15. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide, via the Internet, the modified non-communication application interface to the one or more end users.

16. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide to the one or more end users a modified non-communication application interface to replace a non-communication application interface that has previously been provided to the one or more end users, the modified non-communication application interface including at least the channel to access the message.

17. The system of claim 16, wherein said modified non-communication application interface providing module comprises:
a modified non-communication productivity application interface providing module configured to provide to the one or more end users a modified non-communication productivity application interface to replace a non-communication productivity application interface that has previously been provided to the one or more end users, the modified non-communication productivity application interface including at least the channel to access the message.

18. The system of claim 16, wherein said modified non-communication application interface providing module comprises:
a modified non-communication application interface providing module configured to provide to the one or more end users the modified non-communication application interface to replace the non-communication application interface while the one or more end users are using the non-communication application interface to access a corresponding non-communication application.

19. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication productivity application interface providing module configured to provide to the one or more end users a modified non-communication productivity application interface including at least the channel to access the message.

20. The system of claim 19, wherein said modified non-communication productivity application interface providing module comprises:
a modified word processing application interface providing module configured to provide a modified word processing application interface that includes at least the channel to access the message.

21. The system of claim 19, wherein said modified non-communication productivity application interface providing module comprises:

a modified word processing application interface providing module configured to provide a modified spreadsheet application interface that includes at least the channel to access the message.

22. The system of claim 19, wherein said modified non-communication productivity application interface providing module comprises:
a modified word processing application interface providing module configured to provide a modified presentation application interface that includes at least the channel to access the message.

23. The system of claim 19, wherein said modified non-communication productivity application interface providing module comprises:
a modified word processing application interface providing module configured to provide a modified publishing application interface that includes at least the channel to access the message.

24. The system of claim 19, wherein said modified non-communication productivity application interface providing module comprises:
a modified word processing application interface providing module configured to provide a modified diagramming application interface that includes at least the channel to access the message.

25. The system of claim 19, wherein said modified non-communication productivity application interface providing module comprises:
a modified word processing application interface providing module configured to provide a modified database management application interface that includes at least the channel to access the message.

26. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide to the one or more end users a modified non-communication application interface including a window to access the message, the modified non-communication application interface including at least a tool-bar portion and a workspace portion.

27. The system of claim 26, wherein said modified non-communication application interface providing module comprises:
a modified non-communication application interface providing module configured to provide the modified non-communication application interface including a window that is disposed at least in the tool-bar portion, the window for accessing the message.

28. The system of claim 27, wherein said modified non-communication application interface providing module comprises:
a modified non-communication application interface providing module configured to provide the modified non-communication application interface including a window to access the message and that replaces at least a portion of one or more previously indicated tool-bar icons that was included in a tool-bar portion of an unmodified version of the non-communication application interface.

29. The system of claim 26, wherein said modified non-communication application interface providing module comprises:
a modified non-communication application interface providing module configured to provide the modified non-communication application interface including a window to access the message and that is disposed at least in the workspace portion of the modified non-communication application interface.

30. The system of claim 26, wherein said modified non-communication application interface providing module comprises:
a modified non-communication application interface providing module configured to provide the modified non-communication application interface including a window to access the message and that is disposed in the tool-bar portion and in the workspace portion of the modified non-communication application interface.

31. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide a modified non-communication application interface including a channel that indicates the message to the one or more end users.

32. The system of claim 31, wherein said modified non-communication application interface providing module comprises:
a modified non-communication application interface providing module configured to provide the modified non-communication application interface to the one or more end users, the modified non-communication application interface including a window that displays the message.

33. The system of claim 31, wherein said modified non-communication application interface providing module comprises:
a modified non-communication application interface providing module configured to provide the modified non-communication application interface to the one or more end users, the modified non-communication application interface including an audio channel to audibly indicate the message.

34. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide a modified non-communication application interface to the one or more end users, the modified non-communication application interface including a link to the message.

35. The system of claim 34, wherein said modified non-communication application interface providing module comprises:
a modified non-communication application interface providing module configured to provide a modified non-communication application interface to the one or more end users, the modified non-communication application interface including a hyperlink to the message.

36. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide a modified non-communication application interface to the one or more end users that includes a channel to access a message from a third party.

37. The system of claim 36, wherein said modified non-communication application interface providing module comprises:
a modified non-communication application interface providing module configured to provide a modified non-communication application interface to the one or more end users that includes a channel to access an advertisement from the third party.

38. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide the modified non-communication application interface to the one or more end users while the one or more end users are accessing a non-communication application associated with the non-communication application interface.

39. The system of claim 1, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide independent of the at least one of the one or more non-communication applications the modified non-communication application interface to the one or more end users.

40. The system of claim 39, wherein said modified non-communication application interface providing module comprises:
a modified non-communication application interface providing module configured to provide independent of any action executed by the one or more end users using the at least one of the one or more non-communication applications the modified non-communication application interface to the one or more end users.

41. A system, comprising:
an end user determination module configured to determine which of a plurality of end users having access to one or more non-communication applications through one or more non-communication application interfaces are to be presented with a message;
a modified non-communication application interface providing module configured to provide to one or more end users who have been determined to be presented with the message a modified non-communication application interface that include at least a channel to access the message, the modified non-communication application interface for accessing at least one of the one or more non-communication applications, wherein said modified non-communication application interface providing module configured to provide to one or more end users who have been determined to be presented with the message a modified non-communication application interface that include at least a channel to access the message, the modified non-communication application interface for accessing at least one of the one or more non-communication applications comprises:
a modified non-communication application interface providing module configured to provide the modified non-communication application interface to the one or more end users while the one or more end users are accessing a non-communication application associated with the non-communication application interface, wherein said modified non-communication application interface providing module comprises:
a modified non-communication application interface providing module configured to provide the modified non-communication application interface to the one or more end users when a determination is made that the one or more end users has at least paused in using the non-communication application for at least a predefined amount of time; and
one or more processors.

42. A system, comprising:
circuitry for determining which of a plurality of end users are to be presented with a message, the plurality of end users having access to one or more non-communication applications through one or more non-communication application interfaces, wherein said circuitry for determining which of a plurality of end users are to be presented with a message, the plurality of end users having access to one or more non-communication applications through one or more non-communication application interfaces comprises:
circuitry for determining which of the plurality of end users have one or more characteristics that matches an end user profile indicating one or more end user characteristics of end users who should be presented with the message, wherein said circuitry for determining which of the plurality of end users have one or more characteristics that matches an end user profile indicating one or more end user characteristics of end users who should be presented with the message comprises:
circuitry for determining, based at least in part on the end user profile and computer research activities of the plurality of end users, which of the plurality of the end users are to be presented with the message, wherein said circuitry for determining, based at least in part on the end user profile and computer research activities of the plurality of end users, which of the plurality of the end users are to be presented with the message comprises:
circuitry for determining, based at least in part on the end user profile and Internet search activities of the plurality of end users, which of the plurality of the end users are to be presented with the message; and circuitry for providing a modified non-communication application interface for accessing at least one of the one or more non-communication applications to one or more end users who have been determined to be presented with the message, the modified non-communication application interface including at least a channel to access the message.

43. An article of manufacture, comprising:

a non-transitory storage medium bearing:

one or more instructions for determining which of a plurality of end users are to be presented with a message, the plurality of end users having access to one or more non-communication applications through one or more non-communication application interfaces, wherein said one or more instructions for determining which of a plurality of end users are to be presented with a message, the plurality of end users having access to one or more non-communication applications through one or more non-communication application interfaces comprises:

one or more instructions for determining which of the plurality of end users have one or more characteristics that matches an end user profile indicating one or more end user characteristics of end users who should be presented with the message, wherein said one or more instructions for determining which of the plurality of end users have one or more characteristics that matches an end user profile indicating one or more end user characteristics of end users who should be presented with the message comprises:

one or more instructions for determining, based at least in part on the end user profile and computer research activities of the plurality of end users, which of the plurality of the end users are to be presented with the message, wherein said one or more instructions for determining, based at least in part on the end user profile and computer research activities of the plurality of end users, which of the plurality of the end users are to be presented with the message comprises:

one or more instructions for determining, based at least in part on the end user profile and Internet search activities of the plurality of end users, which of the plurality of the end users are to be presented with the message; and one or more instructions for providing a modified non-communication application interface for accessing at least one of the one or more non-communication applications to one or more end users who have been determined to be presented with the message, the modified non-communication application interface including at least a channel to access the message.

* * * * *